United States Patent [19]
Galiana et al.

[11] Patent Number: 5,984,475
[45] Date of Patent: Nov. 16, 1999

[54] STEREOSCOPIC GAZE CONTROLLER

[75] Inventors: Henrietta L. Galiana, St. Lambert; Ross Wagner, St. Leonard, both of Canada

[73] Assignee: McGill University, Montréal, Canada

[21] Appl. No.: 09/204,508

[22] Filed: Dec. 4, 1998

Related U.S. Application Data

[60] Provisional application No. 60/067,328, Dec. 5, 1997.

[51] Int. Cl.$^6$ ........................................... A61B 3/14
[52] U.S. Cl. .......................... 351/209; 702/150; 382/107
[58] Field of Search .................................. 351/203, 205, 351/209, 210, 211; 382/103, 107, 78; 348/115, 116; 702/85, 92, 150, 152, 153; 396/51; 434/271; 623/4

[56] References Cited

U.S. PATENT DOCUMENTS 4,028,725  6/1977  Lewis ........................................ 348/115
5,583,795  12/1996  Smyth ....................................... 702/150
5,911,035  6/1999  Tsao ......................................... 382/107

FOREIGN PATENT DOCUMENTS 2 226 923   1/1989   United Kingdom .

*Primary Examiner*—George Manuel
*Attorney, Agent, or Firm*—Neil Teitelbaum & Associates

[57] ABSTRACT

An integrated controller for controlling both pan and vergent movements of a stereoscopic vision system, having two cameras, is described. The controller determines motion and direction based on a provided retinal error. Each of the cameras is moved until no retinal error remains which results from camera orientation. A butterfly controller accepts data input relating to retinal errors from any number of sources and provides a single signal relating to common motion and another signal relating to vergent motion to each control circuit. The circuits are designed to operate in common mode or differential mode thereby causing sensors to move in different directions when controlled by same control signals.

36 Claims, 28 Drawing Sheets

Example: $|e_L| = |e_R| = e$ $i_R = k_{verg}(e_R + e_L) + k_{conj}(e_R - e_L) = 2k_{verg}\, e$ $i_L = k_{verg}(e_R + e_L) - k_{conj}(e_R - e_L) = 2k_{verg}\, e$ $E_R = A(s)(i_R + i_L) + B(s)(i_R - i_L) > 0$ $E_L = A(s)(i_R + i_L) - B(s)(i_R - i_L) > 0$ Example: $|e_L| = |e_R| = e$ $i_R = k_{verg}(e_R + e_L) + k_{conj}(e_R - e_L) = -2k_{conj}\, e$ $i_L = k_{verg}(e_R + e_L) - k_{conj}(e_R - e_L) = 2k_{conj}\, e$ $E_R = A(s)(i_R + i_L) + B(s)(i_R - i_L) < 0$ $E_L = A(s)(i_R + i_L) - B(s)(i_R - i_L) > 0$ (a) Conjugate control system. (Differential mode.)

(b) Vergence control system. (Common mode.)

$E_c = \measuredangle(\overline{OT}, \overline{OO'})$ ize/Head Orientation in Robots," filed on Dec. 5, 1997.

STEREOSCOPIC GAZE CONTROLLER

This is a conventional application of U.S. provisional application serial No. 60/067,328 entitled "Novel Controller for Camera(s)/Head Orientation in Robots," filed on Dec. 5, 1997.

FIELD OF THE INVENTION

This invention relates to a binocular controller for an artificial vision system and more particularly to a controller for controlling gaze to reduce retinal errors resulting from imaging a target with each of two imaging devices.

BACKGROUND OF THE INVENTION

The evolution of robots has produced machines of increased complexity and of greater ability. Compared to the first commercial models, which were simple blind servants that could be taught to execute pre-programmed movements, the mobile robots of today are built to interact with the world. The first visual systems which were passive in nature, accepting any data that randomly fell into the field of view, have been replaced by active ones, able to select objects of interest and view them in an intelligent manner. When designers gave robots the means to move about, they brought to bear issues that previously were irrelevant. One such issue is the co-ordination of an artificial vision system mounted on a mobile platform. At present, solutions to this problem have known drawbacks.

From a somewhat philosophical perspective, the current position of robot designers can be compared to that of Mother Nature's in the early stages of biological system design, or evolution. For during the course of designing a moving, seeing robot the designer is faced with the same issues that Mother Nature had to address long ago. On the other hand, the designer is in a favourable position here because he can sneak a peek at existing design strategies (namely nature's) to help guide his own work. It can certainly be argued that designs in nature are not necessarily optimal, but they certainly are robust and serve as a good starting point.

For example, the control of computational vision systems is generally solved using a traditional engineering mindset. Even though knowledge of anatomy and physiology relevant to biological binocular control is now extensive, designers do not use existing natural systems to help guide their work. An artificial vision system is often organized into three modules: (i) an imaging system to acquire images, (ii) an image processing stage, and (iii) a controller. Generally, imaging system design, image processing and control are independent aspects of a vision system and can be designed independently, though the resulting system is highly dependent on each aspect.

Many known vision systems are binocular—for example, those disclosed by Ballard, D. H. in "Animate Vision," Artificial Intelligence, Vol. 48, pp. 57–86, 1991; by Brown, C., in "Gaze Controls Cooperating Through Prediction," Image and Vision Computing, Vol. 8, No. 1, pp. 10–17, 1990; and by Krotkov, E. P. in Active Computer Vision by Cooperative Focus and Stereo, Springer-Verlag, New York, 1989. ISBN 0-387–97109-3. Two common reasons for this choice are that primate vision systems work well and that knowledge about mammalian oculomotor control provides valuable insight into how a vision system might work. Nature, for instance, uses one controller for both eyes in a pair of eyes. Of course, another advantage to modelling primate vision systems is their adaptability. For example, primate vision systems are not known to enter unstable modes of operation. Also, primate vision systems adapt extremely well to a loss of an eye or to a single available eye. Primate vision systems have a fovea—a specialised region of the retina giving such high visual acuity that it is used preferentially for seeing. Foveated animals generally possess image-stabilising reflexes, but also have other reflexes acting to bring selected points of interest to the fovea and then hold them there.

With regard to artificial vision systems, Rotstein and Rivlin (Rotstein H. P., and E. Rivlin, "Optimal Servoing for Acive Foveated Vision," Proceedings of the IEEE Computer Society Conference on Computer Vision and Pattern Recognition, San Francisco, Calif., U.S.A., pp. 177–182, 1996) demonstrated that the need for foveated vision sensors may be established based on control considerations, and that the optimal fovea size may actually be computed. The existence of a fovea presents an inherent trade off: a small foveal window requires little image processing time but places tight demands on tracking performance; alternatively tracking objectives may be relaxed by increasing the foveal zone, but at the expense of slower dynamics due to longer computational delays. Thus, the optimal fovea size is formulated as a maximisation problem involving the plant, computational delays and other hardware restrictions, and the expected bounds of target motion.

Artificial vision systems to date are generally afoveate as a result of commercial imaging technology. However, for the sake of generality and of future development, research into computational vision systems has been conducted with the notion that someday vision systems will typically be foveated. There has already been work in the development of foveated vision sensors and application of spatially varying sensors in vision systems.

Controlling gaze is the operational purpose of some vision systems. Gaze is formally defined as the line of sight measured relative to the world co-ordinate system. The act of gazing at a single point in three-dimensional space is called fixating and the location at which the eyes are directed, the target, is termed the fixation point. The process of gaze control consists of orienting gaze in order to achieve a desired goal.

Within robotics circles, the problem of gaze control is functionally broken down into two problems: gaze holding and gaze shifting. Gaze holding refers to the facility to track a possibly moving target with a viewing system that may also be moving. It also includes compensating for external perturbations to the vision system (due to egomotion, for example) and implies smooth tracking movements. Gaze shifting refers to the rapid redirection of gaze for the purpose of shifting attention to a possibly new target in the visual field. To a physiologist this nomenclature is awkward. Gaze holding implies that the gaze of a vision system is held constant, which is consistent with the definition of gaze. In order to part with this confusing terminology "gaze holding" is referred to herein and in the claims which follow as target stabilisation and "gaze shifting" is referred to herein and in the claims which follow as target acquisition, which is more descriptive of the occurring action.

In the case of a frontal, binocular vision system target stabilisation requires that the line of sight of each eye or imaging device be directed at the same point of interest. Regardless of the mobility of a robot, a vision system that maintains its gaze on a target benefits from improved visual interpretation of the world and, consequently, can interact better therewith.

There are three tasks involved in target stabilisation. A first is locating a fixation point; a second task consists of extracting fixation errors for each imaging device; and the third task is concerned with a control strategy used to servo the gaze successfully.

Vergence involves co-ordination of two eyes under near-target conditions, where proper viewing requires the crossing of the visual axes. Both stereopsis, an ability to visually perceive the third dimension, which depends on each eye receiving a slightly different image of the same object, and bifoveal fixation of a single target require precise alignment of the visual axes. This task is the responsibility of the vergence system.

Generally the first task involves image analysis, which provides a target location, the second task involves extracting retinal errors or other data for provision to a controller for performing the third task. The third task for controlling gaze is often performed by analysing each part of gaze motion separately for each imaging device and then summing appropriate control signals for provision to a plant for controlling imaging device motion.

Target-stabilisation systems should be able to follow a moving target without necessarily recognising it first. Consequently, active vision systems essentially work on the principle that the only knowledge of the target is that the "eyes" are initially pointed at it. The target stabilization problem then is one of maintaining fixation of the moving target from a moving viewing system.

Target stabilisation is known to be advantageous. For example in Coombs, D. J., and C. M. Brown, "Cooperative Gaze Holding in Binocular Vision," IEEE Control Systems Magazine, Vol. 11, No. 4, pp.24–33, 1991 and hereby incorporated by reference, the usefulness of target stabilisation is summarised. For example, image stabilisation allows reduced blur when imaging a moving target. Fixating an object of interest brings it near the optical axis of each eye and minimises geometric distortions. Tracking of a target improves operation of many stereo vision algorithms. Also, stabilising on a moving object in a stationary scene causes the object to "pop-out" as a result of motion blur related to the un-stabilised parts of the scene. There are other advantages and applications of image stabilisation.

Biological gaze control strategies are based upon operating modalities rather than tasks. In fact, only two modalities are known to be used: the fast-phase and slow-phase modalities. These are distinguished by their tactics and operating frequency range.

The slow-phase modality is also known as 'slow control' and 'smooth pursuit' and is responsible only for target stabilisation. It produces 'smooth eye movements' or slow phases—so called because of the low operating bandwidth. Smooth eye movements are largely regarded as sensorimotor reflexes. The following review articles overview slow-phase system response and understanding in biology: Kowler, E., "The Role of Visual and Cognitive Processes in the Control of Eye Movement," in *Eye Movements and Their Role in Visual and Cognitive Processes,* Chapter 1, E. Kowler (Ed.), Elsevier Science Publishers BV (Biomedical Division), Amsterdam, pp. 1–70, 1990; Lisberger, S. G., E. J. Morris, and L. Tychsen, "Visual Motion Processing and Sensory-Motor Integration for Smooth Pursuit Eye Movements," *Annual Review of Neuroscience,* Vol. 10, pp. 97–129, 1987; and Robinson, D. A., "Control of Eye Movements," in *Handbook of Physiology Section* 1: *The Nervous System Vol. II Motor Control,* Part 2, V. B. Brooks Ed., American Physiological Society, Bethesda, Md., pp. 1275–1320, 1981.

The fast-phase modality produces rapid eye movements. The operating bandwidth is much wider than that of the slow-phase modality and eye movement dynamics are faster than that of the eye plant. This modality corresponds to the target acquisition task in gaze control. The fast-phase system is influenced by cognitive factors, even more so than the slow-phase system. A good overview of the fast phase modality in biological systems is found in the following sources: Leigh, R. J., and D. S. Zee, *The Neurology of Eye Movements,* 2nd ed., F. A. Davis Co., Philadelphia, 1991. ISBN 0-8036-5528-2; Lisberger, S. G., E. J. Morris, and L. Tychsen, "Visual Motion Processing and Sensory-Motor Integration for Smooth Pursuit Eye Movements," *Annual Review of Neuroscience,* Vol. 10, pp. 97–129, 1987; and Robinson, D. A., "Control of Eye Movements," in *Handbook of Physiology Section* 1. *The Nervous System Vol. II Motor Control,* Part 2, V. B. Brooks Ed., American Physiological Society, Bethesda, Md., pp. 1275–1320, 1981.

Historically, two categories of rapid eye movements were thought to exist. They were classified as saccades and quick phases, depending on the context under which the movements were evoked. Eventually, it was discovered that saccades and quick phases were, in fact, produced by the same neural circuitry. In accordance with this, rapid eye movements are referred to herein and in the claims that follow as "fast phases".

In a foveated vision system, the need for two operating modalities comes as a result of the conflicting goals when following a moving target as described in Coombs, D., and C. Brown, "Real-Time Binocular Smooth Pursuit," *International Journal of Computer Vision,* Vol. 11, No. 2, pp. 147–164, 1993. It is generally believed that the target pursuit system of primates does not favour either the position or velocity control goals. The slow-phase modality is used to minimise slip and, when the target image deviates too far from the fovea, the fast-phase modality is invoked to quickly reacquire a target—be it a new one or the same one that is falling out of view. Modality switching is a clever non-linear solution to the dilemma of how to minimise both velocity and position error simultaneously, since smooth eye movements alone cannot achieve both goals and saccadic movements cannot reduce motion blur since they don't match velocity. It is more accurate that position and velocity errors each contribute to both slow and fast phases; only their relative importance is variable.

As briefly mentioned above, eye movements may be elicited either by visual or non-visual stimuli. Benefits of a dual-modality control strategy are observed in both instances.

A good overview of biological occumotor control is presented in Galiana, H. L., and J. S. Outerbridge, "A Bilateral Model for Central Neural Pathways in Vestibuloocular Reflex," Journal of Neurophysiology, Vol. 51, No. 2, pp. 210–241, 1984, which is hereby incorporated by reference.

The mammalian eye is essentially a globe held in a socket allowing three degrees of freedom per eye: rotations in the vertical and horizontal planes and rotations about the line of sight. A pair of eyes, is capable of only three types of motion: conjugate, vergence and torsional movements. Inputs to the brain are transformed by sensors that respond to a specific visual or vestibular stimulation. In total there are three types of stimuli to process. Significantly, regardless of the nature of the excitation, similar eye movements arise.

SUMMARY OF THE INVENTION

In accordance with the invention there is provided a method of controlling gaze in a binocular vision system having two imaging devices and at least a plant for moving at least an imaging device comprising the steps of:

a) providing to a processor a retinal error relating to location of a target as imaged by each of the two imaging devices;

b) providing to the processor a model related to each of the two imaging devices; and, c) using the processor, determining from both retinal errors absent calculation of the target location in spatial co-ordinates a control signal related to imaging device motion for reducing the provided retinal errors.

In accordance with this embodiment, the control signal may comprise two control signals for controlling device motion along a same dimension and within a same plane. Alternatively, the control signal comprises at least three control signals for controlling device motion in each of two directions. Preferably, motion of each of the two imaging devices is controlled by a separate plant associated with each imaging device. Optionally, another plant associated with a movable platform upon which both imaging devices are disposed is used. In an embodiment, a same control signal is provided to each of the plants.

Preferably, the controller comprises a butterfly controller. In accordance with this, the controller exhibits symmetry between its two sides at a core thereof. More preferably, the entire control exhibits symmetry. In accordance with the invention, the controller supports sensory fusion accepting further sensor data for use in determining the control signal. Of course, when referring to the butterfly controller, the term syummetry Since, in a stereoscopic vision system, the controller controls vergence of the imaging devices, the controller is also useful for measuring distance. This is valuable for focusing imaging devices, for manufacturing processes, for mapping tracked object trajectory or motion, and so forth.

In accordance with yet another embodiment, the butterfly controller supports two modalities—fast-phase and slow-phase, gain values within the controller different for different modalities. For example, some gain values are adjusted to 0 (zero) in one modality and to a non-zero value in the other modality.

In accordance with another embodiment of the invention there is provided a method of controlling sensor orientation in a bi-sensor system including a first sensory device, a second sensory device and a plurality of plants for controlling motion of the sensory devices, the method comprising the steps of:

a) providing to a processor sensory errors relating to a location of a target as sensed by each of the two sensory devices;

d) providing a model related to each plant from the plurality of plants to the processor; and, e) using a processor having a symmetric topology determining a same output signal for provision to the plurality of plants for controlling the sensory device motion, the control signal related to sensory device motion for reducing the sensory error from said sensory device, the determination in dependence upon the provided model and the provided sensory errors.

In accordance with another aspect of the invention, there is provided a controller for a vision system having an imaging device associated with a plant for providing motion to the imaging device, the controller comprising:

a first processor for controlling saccade phase movement of the imaging device, the first processor having a first input and a first output;

a second processor for controlling slow phase movement of the imaging device, the second processor having a second input and a second output;

wherein the second processor and the first processor are substantially same and are provided with same input signal and provide an output signal to a same plant.

There are many advantages to the present invention including support for sensory fusion, adaptability, robustness, stability, and performance.

BRIEF DESCRIPTION OF THE DRAWINGS

Exemplary embodiments of the invention will now be described in conjunction with the drawings, in which.

DETAILED DESCRIPTION OF THE INVENTION

Figure 1:
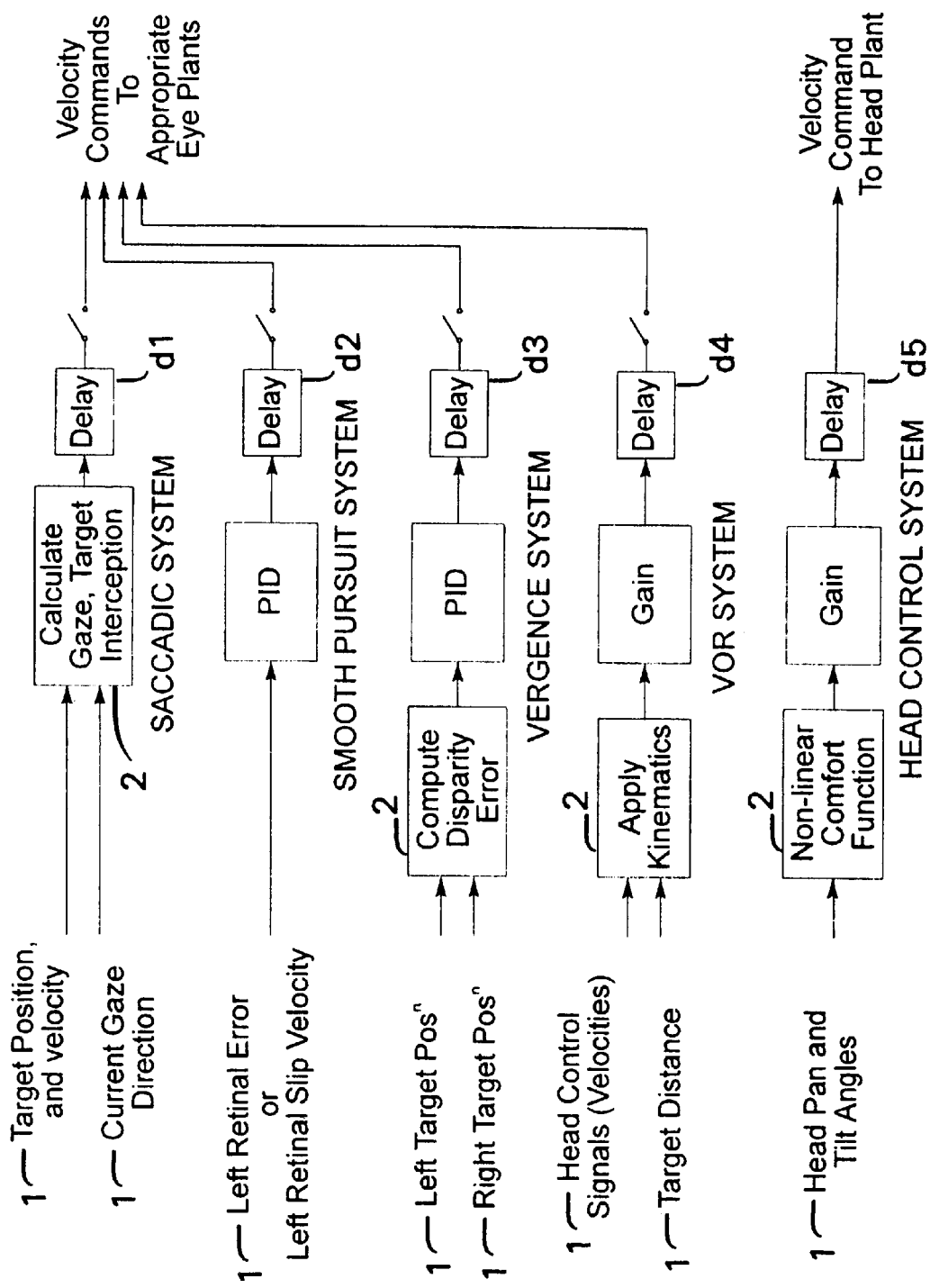
FIG. 1 is a schematic block representation of a controller having a parallel architecture.

Referring to FIG. 1, a schematic representation of organisation of a parallel architecture controller is shown. The scheme is a classical parallel architecture where each branch represents a low-level behaviour, or task to be performed. Each sensory input 1 is provided to a processor 2 for analysis. Each path has a delay shown as d1 . . . d5. Of course, inclusion of other paths will result in additional delays. The system, as described above, has limited adaptability, flexibility, and stability.

In a task-based control scheme, typically used in robotics, each plant is assigned a set of tasks to be performed. Each task is then associated with a dedicated controller, so that a set of tasks requires a bank of controllers. A multi-platform system, then, would be serviced by an independent bank of controllers for each platform. However, with regard to oculomotor control it is known that nature does not use a bank of controllers since it does not approach the control problem from the point of view of tasks. An integrated methodology is used instead. The advantage of this approach is that additional plants and tasks do not require additional independent controllers. New demands are accommodated by introducing additional circuitry around a pre-existing, nested controller.

In contrast to prior art implementations of artificial vision systems, in nature, co-ordination of eyes and head is done simultaneously, and is really treated as one problem as opposed to two.

The brain receives substantial multi-sensory cues such as visual, auditory, somatosensory, and so forth. A biological system allows directing of gaze toward any such cue(s). Not only are head and eye movement co-ordinated, but in general the body as a whole is co-ordinated during gaze shifts. In order to achieve this, co-ordinated movement based on a number of very different sensory inputs is performed. Thus, it is evident that a brain performs some form of sensory fusion to determine a response from many sensory inputs. One site for sensory fusion is the superior colliculus (SC); it is known to be a critical structure in the control of orientation.

The nervous system imposes a high degree of organisation in the way that sensory information is distributed and represented. For example, the SC is organised in multiple layers, some of which are purely sensory, while others combine sensory (input) and motor (output) signals: it provides a topographical map of orientation errors originating from multiple sensory sources. Generally, individual sensory representations in both superficial and deeper layers are spatially congruent (i.e., registered). Such registration is necessary to enable a unified experience of the external world. Furthermore, the "motor" organisation of the deeper layers is also topographic and is spatially registered with the sensory representations in the SC, in spite of its different role.

The alignment of the sensory and motor topographies yields a simple method of integrating multiple sensory cues for the simultaneous co-ordination of several platforms. Conversely, the sensory-motor registration scheme may facilitate the use of common control signals in the co-ordination of multiple platforms. A unimodal (e.g., tactile) sensory cue, produces an orientation of the eyes, head, limbs, etc., that gives the subject a better view of the stimulus.

Sensory integration is not as straightforward as it might initially appear. One issue is that of accommodating stimuli coded in different reference frames. A visual stimulus, for instance, is coded as a retinal error in an eye-relative co-ordinate system. Thus, the spatial location of the target is based on the retinal error, the orientation of the eye in the head and the head in space. Auditory targets are localised using a head-centred co-ordinate system, relying on interaural differences in the timing and intensity of incoming sound waves. Finally, a tactile stimulus is localised using a third reference system, body-centred, based upon the location of the stimulus on the body and the angles of intervening joints. Clearly, signals relating target location are processed differently for each sensory system, before being fused in a shared collicular map.

Generally, gaze shifts in humans are performed with coordinated eye and head movements, suggesting that a common signal drives both the eye and head motor systems; the SC is believed to provide this signal. At first, it may appear that the SC, analogous to kinematic systems, uses multi-sensory information to reconstruct an absolute target position in space and then directs gaze to that goal. However, it is believed that this is not the case. Coding within the SC is in the format of a topographical motor-error signal, relating the site of activity to the size and direction of a required gaze shift.

Sensors in eye muscles encode muscle length (eye position). But large signal delays make them unusable in the control of active eye movements Consequently, a brain must estimate eye orientation internally to implement feedback control; this estimate is referred to as an efference copy.

It is widely accepted that saccadic eye movements are generated by a local feedback loop in the brain stem; that the eye is driven until an internally monitored "motor error" is zeroed. Most models of the (ocular) saccadic system place the SC inside the local feedback loop. When it became clear that the ocular saccadic system was a subset of the gaze saccadic system allowing for a free head, the previous concept of a "motor error" was extended to "gaze motor error" that controlled both eye and head. A saccade towards a stationary visible target typically falls short of its goal. Though a secondary saccade is often used to finally foveate the target, the same effect is sometimes achieved with postsaccadic drifts, or "glissades." Since the goal during postsaccadic drift is to foveate a target, the corresponding action at the SC motor layers is to zero the motor error. A reasonable claim, then, is that during slow phase the collicular goal is to zero motor error, just as in the case of saccadic gaze shifts.

Target stabilisation and target acquisition represent two conflicting goals in oculomotor control and it is generally accepted that two operating modalities (slow and fast) are required to meet these demands. The response caused by switching between these modalities is called nystagmus.

A classical model of a dual-modality system has each modality-controller operating independently and simultaneously. Here, commands to direct eye movement, the so-called pre-motor drive, consist of selective summation of the individual modality-controller outputs. Unfortunately, such a topology cannot explain recent neurophysiological observations. Head motion information (linear and angular) originates in the vestibular sensors and is known to come directly into each side of the brainstem at a neuron pool called the vestibular nucleus (VN). Furthermore, it has been discovered that most cells within each pool identified as pre-motor also carry an eye position signal, which is updated continuously for all types of eye movements. Clearly, nature does not rely on an architecture of parallel independent slow and quick-phase controllers.

Eye movements elicited by different sensory stimuli are called reflexes such as pursuit, optokinetic, vestibular, and so forth. In prior art, these are also usually modelled as an ensemble of parallel dedicated controllers. Recent behavioural studies clearly demonstrated that interactions among reflex subsystems cannot properly be modelled as a summation of independent pre-motor commands. Non-linear interactions between the vergence and conjugate subsystems have been sited for vergence/saccadic, vergence/vestibular, and vergence/optokinetic studies. The results suggest a central coupling between subsystems, as if the whole oculomotor system was built-up around a "core" common to the different subsystems. The central coupling hypothesis is further supported by neurophysiological evidence, demonstrating that several pre-motor nuclei participate in the control of a variety of ocular reflexes. Activity within the vestibular nucleus, for instance, is actually modulated by all types of ocular reflexes, including the vergence set point. Furthermore, neurons in the deep layers of the SC project to the vestibular nucleus as well. Thus, all sensory information seems to converge, in one way or another, onto the vestibular nucleus. This demonstrates another site for sensory fusion, besides the SC.

Figure 2:
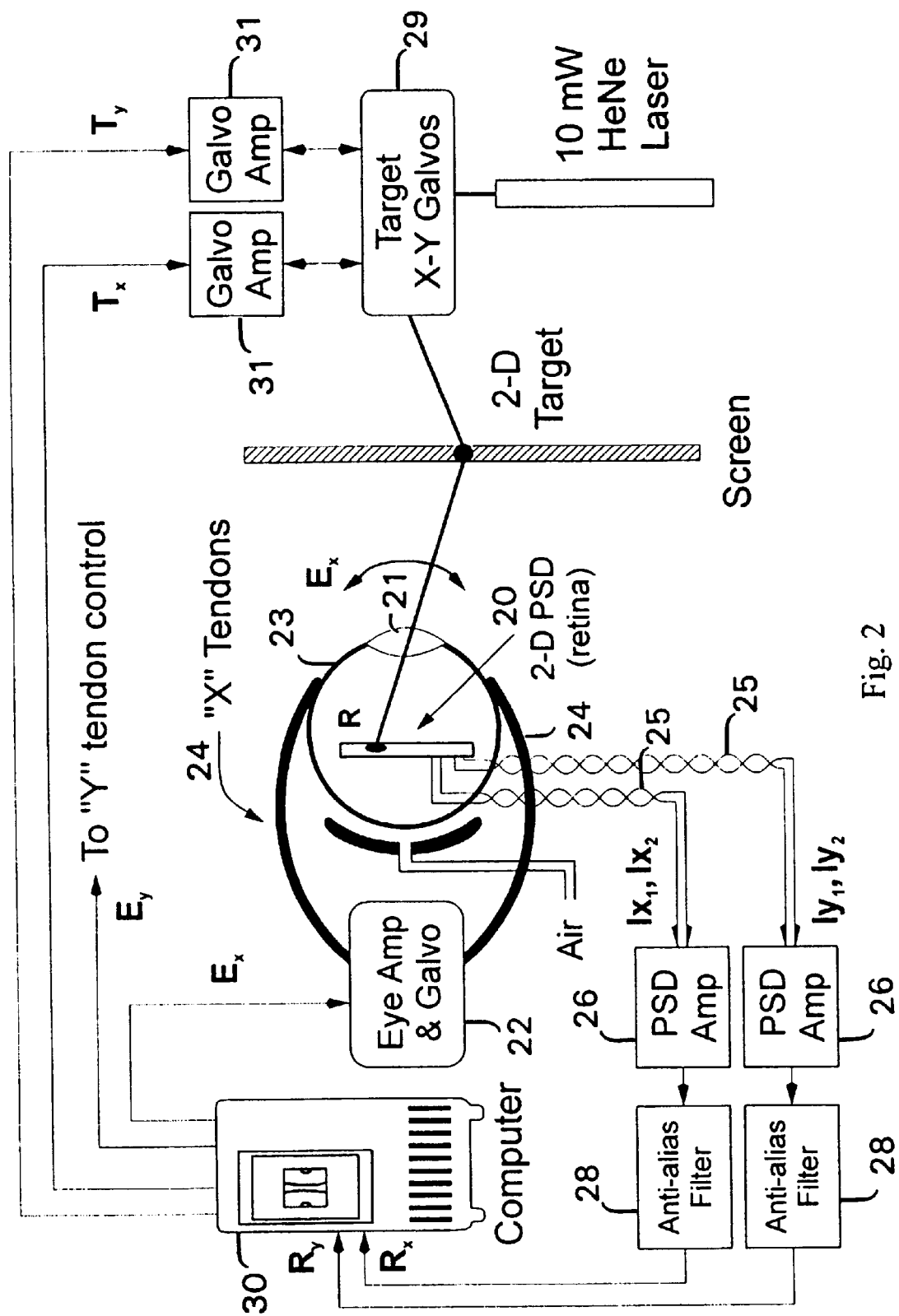
FIG. 2 is a schematic diagram of an imaging device for use with a controller according to the invention.

In order to explain a controller according to the invention, it is helpful to provide a standard platform for the controller to control. Of course, the controller according to the invention is applicable to other platforms as well. Referring to FIG. 2, a platform for use with the present invention is shown comprising two imaging devices 20 (only one is shown). As set out below, the imaging devices are preferably identical. Intensity imaging devices are commonly used, but range imaging devices or other known imaging devices will work as well. It is possible to use different imaging devices in accordance with the invention; however, due to added complexity of such an embodiment, the preferred embodiment is described with reference to two identical imaging devices.

Imaging device motion for each imaging device 20 is provided by a plant 22. The imaging devices 20 and the plants 22 are statically mounted in accordance with the preferred embodiment. Because of the nature of a vision controller according to the present invention, it is possible to mount the imaging devices 20 on one or more moving platforms (not shown). The plants comprise the imaging devices and actuators in the form of galvanometers attached to pulleys bearing wires 24. The wires 24 act to pull either side of the imaging device 20 in order to angle the imaging device 20. Signals from the imaging devices 20 are provided to amplifiers 26 and then to filters 28. From the filters, the signals are provided to a processor 30 comprising a controller 32 for providing control signals to the plant 22.

According to the invention, a binocular controller inspired by nature is disclosed. In order to present a description in a simplified fashion, the preferred embodiment is explained below with reference to a binocular gaze controller confined to a single horizontal plane. Of course the system may be extrapolated to a truly three-dimensional binocular gaze controller. Further, the system may be extrapolated to use with more than two imaging devices, different imaging devices, and different forms of input sensory information.

The description of a preferred embodiment proceeds as follows: an examination of biological eye movement in a single horizontal plane and definition of a convenient co-ordinate system; a description of the core computational "engine" of the controller, a two-sided system capable of simultaneously coordinating two imaging devices in a plane; a description of additional circuitry for a basic pursuit system using slow-phase gaze control; a description of additional circuitry for a fast-phase gaze control; a description of a merger of the two systems; and then a description of gaze control in a three-dimensional space.

Though it is conventional to change the case of a variable when taking its Laplace transform, the notational convention used herein and in the claims which follow is not to change the case of a variable when taking its Laplace transform. Thus, L{e(t)}=e(s) and L{E(t)}=E(s). Finally, for instances when a variable is to be referenced without concern of its domain, e.g., E(t) or E(s), one of the following notations are used: 'E' or 'E(●)'.

Co-ordinate System

Figure 3:
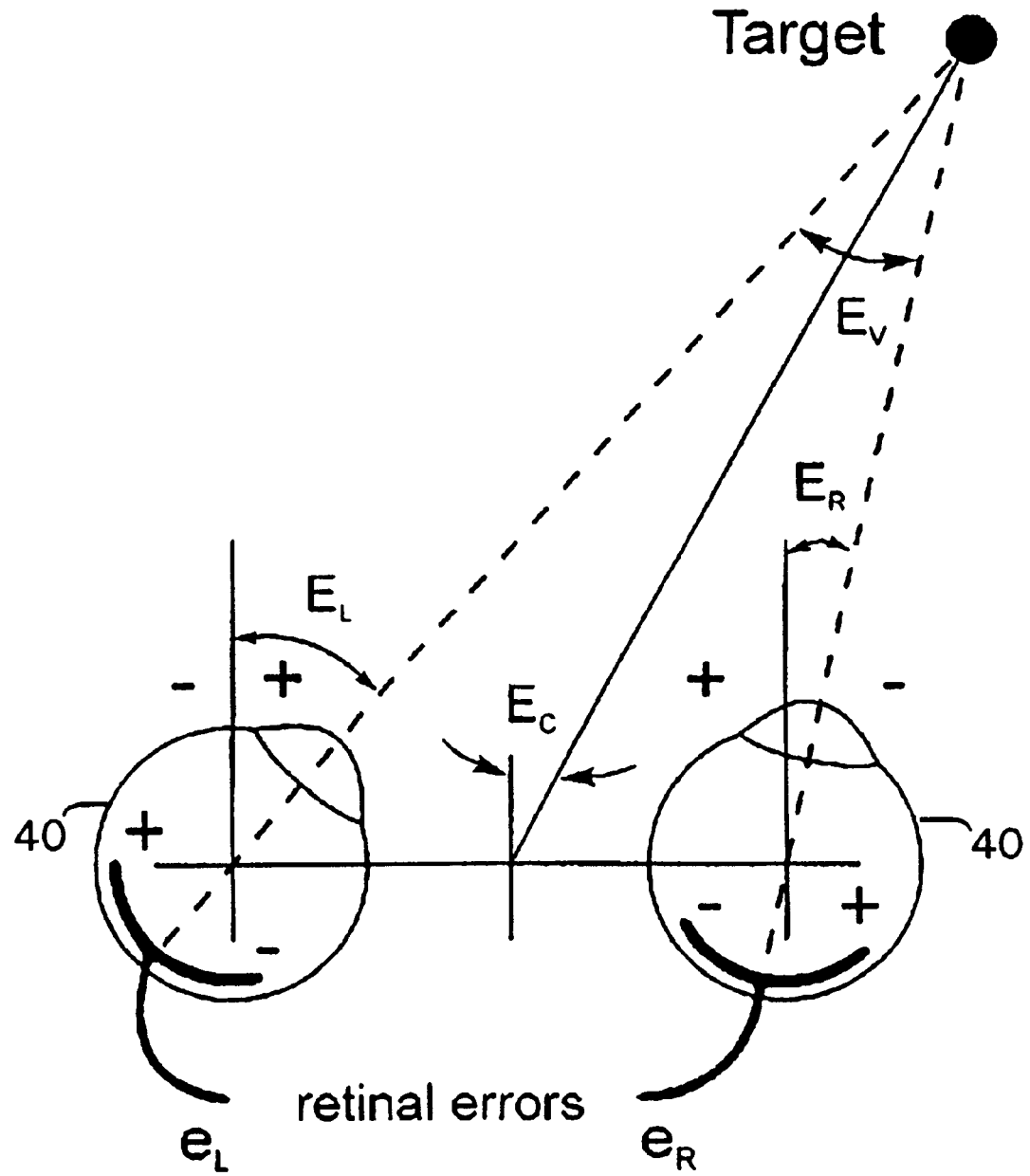
FIG. 3 is a simplified diagram of two eyes demonstrating vergence, target, and lines of sight.

Referring to FIG. 3, two eyes 40 observing a target confined to motion in a plane defined by the page are shown in horizontal cross-section. The diagram depicts eyes in execution of horizontal movement; vertical eye movements are discussed below. $E_L$ and $E_R$ represent the left and right-eye rotations, respectively. By convention nasal, inward, eye rotation is taken to be positive. In frontal eyed animals, as depicted here, it is possible to express eye positions in terms of conjugate ($E_C$) and vergence ($E_V$) components as defined in $$E_C = \frac{1}{2}(E_R - E_L) \tag{5.1}$$

$$E_V = (E_R + E_L) \tag{5.2}$$

The conjugate component indicates an average direction in which the eyes are pointed while a vergence component refers to an angle subtended by the lines of sight of each of the two eyes. The advantage of this co-ordinate system becomes apparent below.

Butterfly Controller

Figure 4:
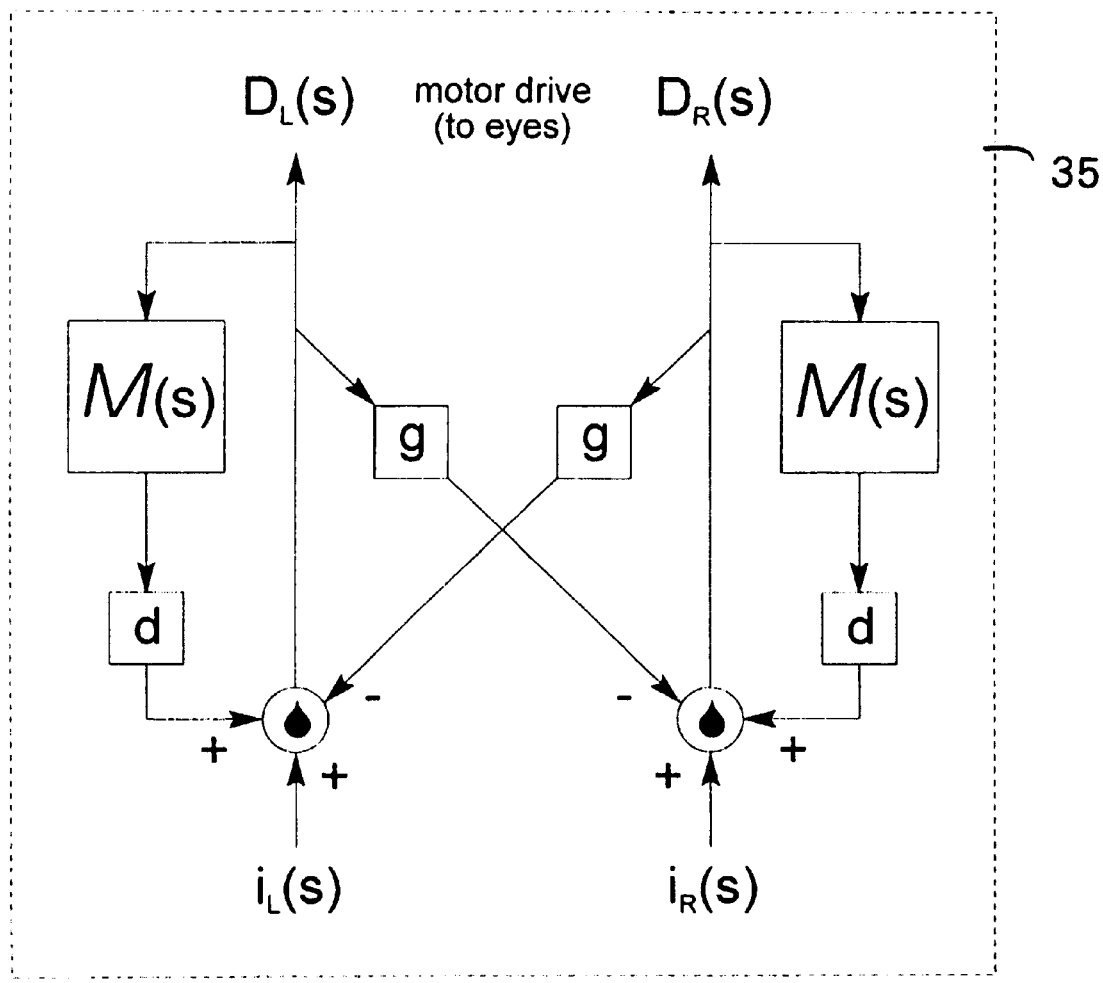
FIG. 4 is a simplified block diagram of a core of a butterfly controller.

Despite an ability of recent biological models to reproduce physiological and behavioural observations, oculomotorists are generally reluctant to accept this alternate approach. This has prevented implementation of binocular controllers based on recent biological models. However, the heart of a binocular controller according to the invention is related to a biological gaze controller and more particularly to the recent biological models thereof. Referred to as a "butterfly" a controller topology and shown in FIG. 4 is a preferred embodiment of the core of a controller according to the invention. It is referred to as a butterfly controller 35 because of the substantial symmetry between the two sides of the controller, and the presence of midline interconnections. Of course, some dissimilarity between the sides of the butterfly controller may exist.

The butterfly controller 35 forms the core of the controller. Because of its symmetry, it is capable of simultaneously coordinating both vergence and conjugate components of imaging device position. System transfer functions are as follows:

$$D_L(s) = \frac{1}{2}\left(\frac{i_R(s) + i_L(s)}{1 + g - dM(s)}\right) - \frac{1}{2}\left(\frac{i_R(s) - i_L(s)}{1 - g - dM(s)}\right) \quad (5.3)$$

$$D_R(s) = \frac{1}{2}\left(\frac{i_R(s) + i_L(s)}{1 + g - dM(s)}\right) + \frac{1}{2}\left(\frac{i_R(s) - i_L(s)}{1 - g - dM(s)}\right) \quad (5.4)$$

It is clear that the butterfly controller 35 behaves as a differential amplifier where each output, $D_R$ and $D_L$, responds to a common mode of input signals, $i_R+i_L$, and differential mode of inputs, $i_R-i_L$. Each mode has different dynamics. Prior art approaches attempt to model each dynamic separately and to determine a control value for each dynamic. The use of the butterfly controller obviates a need to model each dynamic separately thereby simplifying overall design.

Imaging device position is related to motor drive through the relation $E_n(s) = 5P(s)D_n(s)$, where $P(s)$ represents the imaging device plant as defined in equation (4.3)

$$P(s) = \frac{p_1^2}{(s + p_1)^2} \quad \text{where } p_1 = 460 \text{ rad/sec,} \quad (4.3)$$

and n=L,R. The factor of 5 in $E_n(s)$ accounts for the fact that, statically, a 1V galvo drive produces 5° of shaft rotation. Given this, we can employ equations (5.1) through (5.4) to compute conjugate and vergence components of imaging device position and obtain the following equations:

$$E_C(s) = \frac{5}{2}\left(\frac{i_R(s) - i_L(s)}{1 - g - dM(s)}\right) P(s) \quad (5.5)$$

$$E_V(s) = 5\left(\frac{i_R(s) + i_L(s)}{1 + g - dM(s)}\right) P(s) \quad (5.6)$$

From the point of view of algebraic overhead, it is more desirable to use a conjugate-vergence co-ordinate system than it is to use individual expressions of imaging device responses. More importantly, the correspondence between the differential mode and the conjugate response as well as the correspondence between the common mode and the vergence component are noted. This link between the butterfly modes and the components of imaging device position are exploited in the controller according to a preferred embodiment.

In passing, it is enlightening to express the above sets of transfer functions as transfer matrices, as in:

$$\begin{pmatrix} E_L \\ E_R \end{pmatrix} = \begin{bmatrix} \left(\frac{-5gP}{(1+g-dM)(1-g-dM)}\right) & \left(\frac{5(1-dM)P}{(1+g-dM)(1-g-dM)}\right) \\ \left(\frac{5(1-dM)P}{(1+g-dM)(1-g-dM)}\right) & \left(\frac{-5gP}{(1+g-dM)(1-g-dM)}\right) \end{bmatrix} \begin{bmatrix} i_R \\ i_L \end{bmatrix} \quad (5.7)$$

$$\begin{pmatrix} E_V \\ 2E_C \end{pmatrix} = \begin{pmatrix} E_R + E_L \\ E_R - E_L \end{pmatrix} = \begin{pmatrix} \frac{5P}{1+g-dM} & 0 \\ 0 & \frac{5P}{1-g-dM} \end{pmatrix} \begin{pmatrix} i_R + i_L \\ i_R - i_L \end{pmatrix} \quad (5.8)$$

The Laplace variable, s, has been omitted for the sake of compactness and technically signals should be represented in the following notation $\{E_L(s), E_R(s), P(s), M(s), i_R(s), i_L(s), E_V(s), E_C(s)\}$. It is evident that the co-ordinate mapping from $\{E_L, E_R\}$ to $\{E_C, E_V\}$ diagonalises the transfer matrix and hence decouples the conjugate and vergence systems.

A butterfly controller according to the invention is well suited for accommodating various sensory inputs and for performing sensory fusion. In a preferred embodiment, butterfly controller inputs are driven with retinal position error and retinal slip. Of course in another embodiment, other sensor inputs are used either with the retinal errors or instead of the retinal error data.

System response is a significant concern in any controller design. In a biological setting, the imaging device plant (eye) is sluggish and must be compensated for by the controller to achieve high-speed movements. This plant is typically modelled as a first-order low-pass filter, and compensation is achieved by cancelling its pole with a plant inverse imbedded in the controller. Alternatively, a same compensation is achieved using model feedback as in the preferred invention embodiment. In FIG. 4, M(s) blocks represent a model of the imaging device plant (i.e., when M(s)=P(s)). Since M(s) is in the feedback branch its poles become the zeros of the closed-loop system, thereby achieving compensation. This approach has been shown to be more robust in the presence of plant model uncertainty. Of course, M(s) need not be identical to P(s); a reduced form of the plant representation is often sufficient.

The characteristics of a mechanical imaging device plant used in this work represent a scenario that is different from that seen in biological systems: the plant does not need "speeding up" and, hence, complete pole-zero cancellation is not necessary. Each M(s) block need not accurately model the imaging device plant beyond the intended controller operating frequency range and consequently is chosen to promote simplicity of analysis. Since the imaging device plant is represented as an all-pole, 2nd-order, critically damped system, each M(s) block is chosen to be a 1st-order, low-pass system with a same pole as the imaging device plant. Thus, not every plant pole is matched with a controller zero since the true imaging device plant is of higher order than the model reference block.

Expanding and simplifying the butterfly transfer functions, (5.5) and (5.6), yields $$\frac{E_V(s)}{i_R(s)+i_L(s)} = \frac{5}{p_1(1+g-d)} \frac{(s+p_1)}{(sT_{verg}+1)} P(s) \quad (5.9)$$

$$\frac{E_C(s)}{i_R(s)-i_L(s)} = \frac{5}{2p_1(1-g-d)} \frac{(s+p_1)}{(sT_{conj}+1)} P(s) \quad (5.10)$$

where $T_{verg}$ and $T_{conj}$ are defined as $$T_{verg} = \frac{1+g}{p_1(1+g-d)} \quad (5.11)$$

$$T_{conj} = \frac{1-g}{p_1(1-g-d)} \quad (5.12)$$

$T_{verg}$ and $T_{conj}$ represent "dark" vergence and conjugate time constants, respectively, and are inherent to the butterfly controller structure.

Stability requires that $T_{verg}>0$ and $T_{conj}>0$, which is satisfied if for each time constant expression the sign of the numerator and denominator are same. From a purely mathematical point of view, there are four cases to consider; however in the spirit of the invention, physiological observations are used to restrict the cases to those that are analogous or representative of biological systems. Firstly, in mammal oculomotor systems, connections across the midline and within each brainstem half provide positive feedback loops, which increase the conjugate time constant beyond that of the plant. This is known; see for example Mano, N., T. Oshima, and H. Shimazu, "Inhibitory Commissural Fibers Interconnecting the Bilateral Vestibular Nuclei," *Brain Research*, Vol. 8, pp. 378–382, 1968 and Nakao, S., S. Sasaki, R. H. Schor, and H. Shimazu, "Functional Organization of Premotor Neurons in the Cat Medial Vestibular Nucleus Related to Slow and Fast Phases of Nystagmus," *Experimental Brain Research*, Vol. 45, pp. 371–385, 1982, which are hereby incorporated by reference. Furthermore, $T_{conj}>1/p_1$ which gives rise to the following inequality:

$$\frac{1-g}{p_1(1-g-d)} > \frac{1}{p_1} \quad (5.13)$$

Accordingly, dependent parameters g and d are solved from (5.11) and (5.12) to yield (5.14) and (5.15). In the present embodiment, the requirement that d>0 implies that $\beta+\alpha>0$. It then follows that $\beta-\alpha>0$ in order that g>0. Also, the requirement that $\beta-\alpha>0$ is satisfied if $T_{conj}>T_{verg}$.

$$d = \frac{2}{\beta+\alpha} \quad (5.14)$$

$$g = \frac{\beta-\alpha}{\beta+\alpha} \quad (5.15)$$

where $\alpha \equiv \frac{T_{conj}p_1}{T_{conj}p_1-1}$, and $\beta \equiv \frac{T_{verg}p_1}{T_{verg}p_1-1}$.

Pursuit: The Slow Phase System

The slow phase system implemented according to the present invention provides a feedback controller for adjusting gaze to reduce small retinal errors. Such a system is highly advantageous in tracking target motion or improving target alignment.

Figure 5:
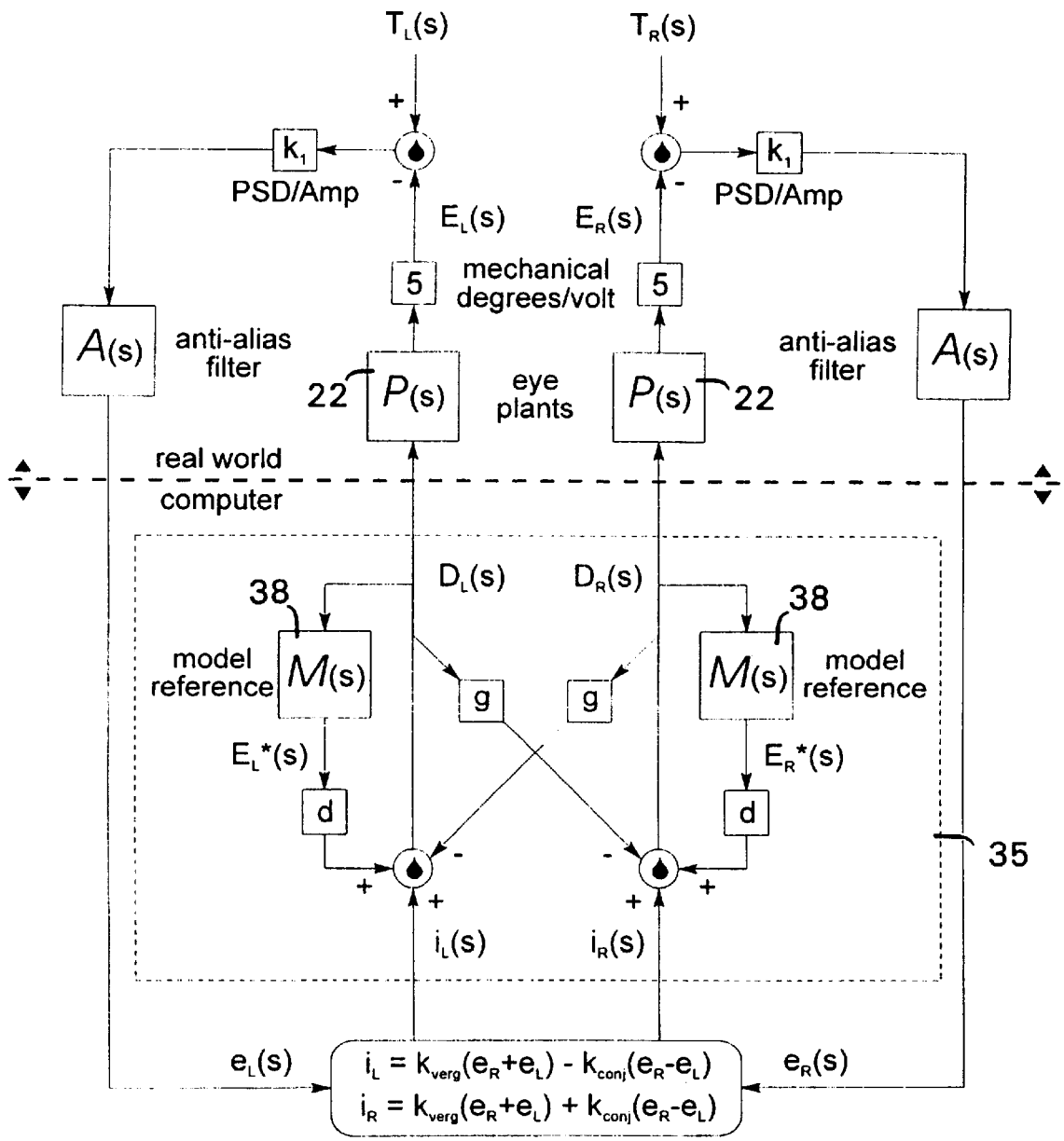
FIG. 5 is a simplified block diagram of an expanded butterfly controller comprising a butterfly core and symmetric feedback paths.

Referring to FIG. 5 a slow-phase system according to the invention is shown. At a centre of the system, the afore-mentioned butterfly controller 35 is shown for driving the imaging device plants 22, P(s). M(s) are "estimates" of the imaging device plants in the form of models 38 and form part of feedback loops within the butterfly controller 35. An important by-product of this configuration is that an output of M(s), $E_n^*(s)$, provides estimates of actual imaging device positions, $E_n(s)$. These estimates are advantageous for use in a fast-phase system, described below and forming part of the preferred embodiment.

Figure 6:
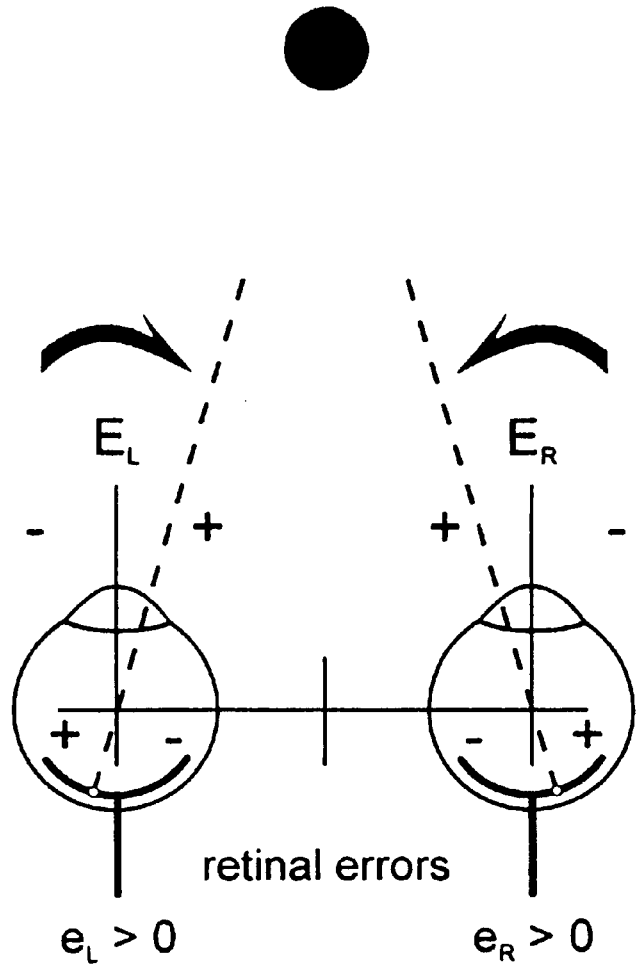
FIG. 6 is a simplified diagram of two eyes verging on a central target.
Figure 7:
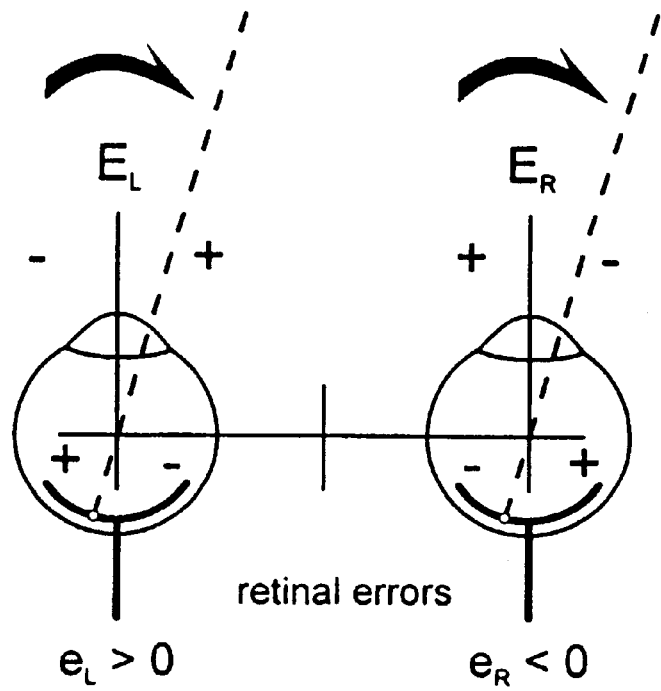
FIG. 7 is a simplified diagram of two eyes fixating on a far distant object and exhibiting substantially conjugate displacement.

Retinal errors $e_n(s)$ are combined to yield controller inputs $i_n(s)$ in such a way as to exploit a correspondence between the differential mode/conjugate component and the common mode/vergence component of the controller mode/imaging device responses. FIGS. 6 and 7 demonstrate the workings of this through extreme examples. For an arbitrarily positioned target initial retinal errors are somewhere between the two examples shown and are modelled as being a linear combination of the two presented cases. In general, retinal errors have both conjugate and vergent components. Returning to our analogy with biological systems, the combination of retinal error signals from both imaging devices are analogous to a linear combination of the binocular zones from each superior colliculus, thereby representing the binocular zone of the whole visual field. The $i_n(s)$ drive the control system and hence act as motor errors, for zeroing, consistent with the role of the colliculus output in biology.

As in the butterfly controller analysis, it is far more convenient to analyse the slow-phase system in a framework of the conjugate-vergence co-ordinate system. In order to do so, the notion of a conjugate and vergence target ($T_C(s)$ and $T_V(s)$) is hereby introduced. Referring again to FIG. 3 it is apparent that a same form of relationship guiding the mapping between $\{E_L(s), E_R(s)\}$ and $\{E_C(s), E_V(s)\}$ applies to the case of the target signal, giving rise to $$e_R(s)=k_1A(s)(T_R(s)-E_R(s)) \quad (5.16)$$

$$e_L(s)=k_1A(s)(T_L(s)-E_L(s)) \quad (5.17)$$

Considering the vergence system, from FIG. 5, $$i_R(s)+i_L(s)=2k_{verg}(e_R(s))+e_L(s)) \quad (5.18)$$

Substituting (5.16) and (5.17) into (5.18) yields $$i_R(s)+i_L(s)=2k_{verg}k_1A(s)[(T_R(s)+T_L(s))-(E_R(s)+E_L(s))] \quad (5.19)$$

Substituting (5.19) into (5.6) yields $$E_R(s)+E_L(s) = \frac{10k_{verg}k_1A(s)P(s)}{1+g-dM(s)}[(T_R(s)+T_L(s))-(E_R(s)+E_L(s))] \quad (5.20)$$

Figure 8:
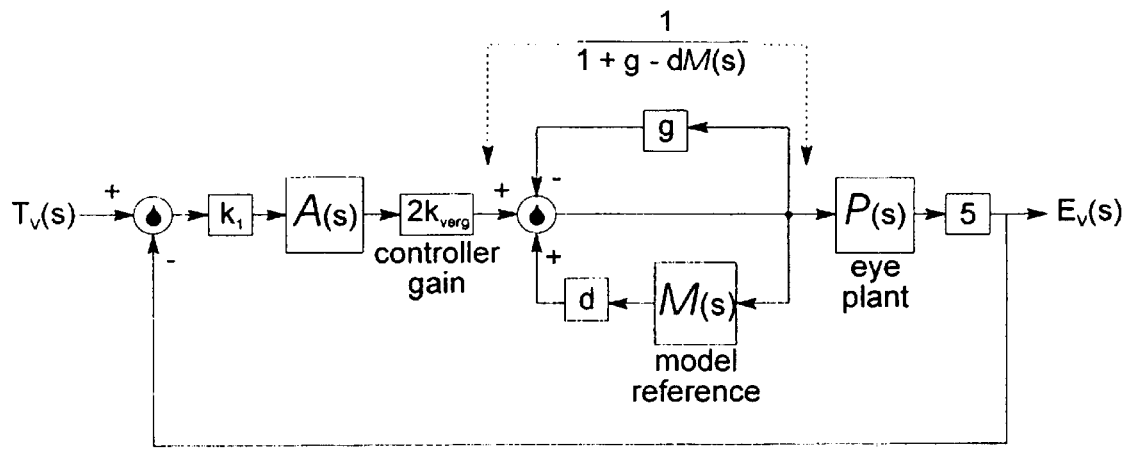
FIG. 8 is a block diagram of a conjugate control system and of a vergence control system.
Figure 8:
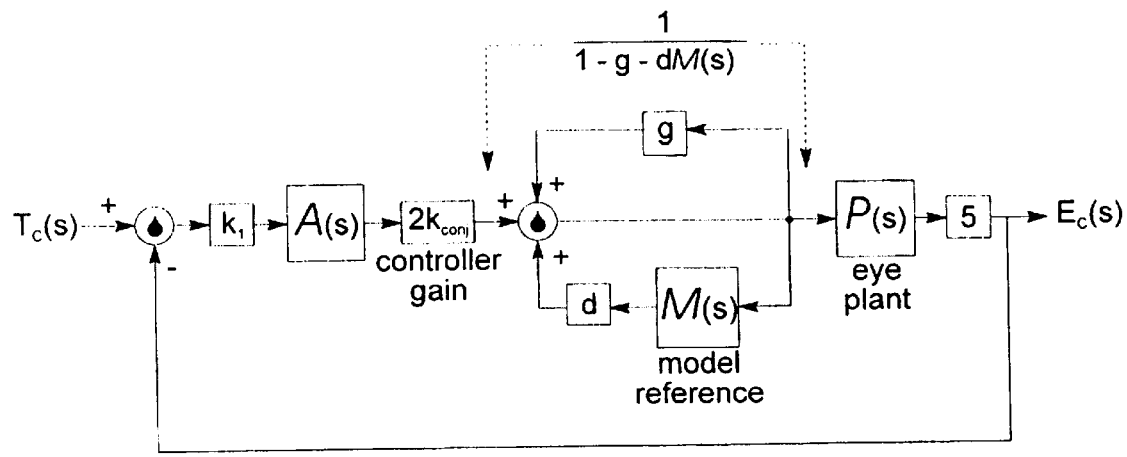

The final expression then, relating the vergence component of imaging device movement to the common-mode input is obtained by simplifying (5.20) to yield (5.21). Through similar steps the conjugate system is analysed to yield a transfer function shown in (5.22). Because the conjugate and vergent modes operate independently of each other, it is possible to decompose the slow-phase system of FIG. 5 into two, simpler, independent control systems as shown in FIG. 8.

$$\frac{E_V(S)}{T_V(s)} = \frac{E_R(s)+E_L(s)}{T_R(s)+T_L(s)} = \frac{10k_{verg}k_1A(s)P(s)}{1+g-dM(s)+10k_{verg}k_1A(s)P(s)} \quad (5.21)$$

-continued $$\frac{E_C(S)}{T_C(s)} = \frac{E_R(s) - E_L(s)}{T_R(s) - T_L(s)} = \frac{10k_{conj}k_1 A(s)P(s)}{1 - g - dM(s) + 10k_{conj}k_1 A(s)P(s)} \quad (5.22)$$

Gain Parameters for use in the Controller

The mechanical frequency response of the imaging device-plant combination affect selection of parameters. For example, some equivalent biological response parameters may not be achieved with some apparatus. In general, a parameter set can be deduced that satisfies a wide scope of design specifications. Alternatively, mechanical components are selected to match biological system components. Further alternatively, parameters are selected to achieve desired results independent of biological system abilities.

Consider operation of the slow-phase system without any target to pursue, for example in total darkness. With visual information absent ($e_L = e_R = 0$) the system degenerates to that of a butterfly controller operating in isolation—open-loop. Substituting for P(s), from equation (4.3), in equations (5.9) and (5.10) yields equations $$\frac{E_V(s)}{i_R(s) + i_L(s)} = \quad (5.23)$$
$$\frac{5}{(1 + g - d)} \frac{1}{(sT_{verg} + 1)} \frac{p_1}{(s + p_1)} \approx \frac{5}{(1 + g - d)} \frac{1}{(sT_{verg} + 1)}$$

$$\frac{E_C(s)}{i_R(s) - i_L(s)} = \quad (5.24)$$
$$\frac{5}{2(1 - g - d)} \frac{1}{(sT_{conj} + 1)} \frac{p_1}{(s + p_1)} \approx \frac{5}{2(1 - g - d)} \frac{1}{(sT_{conj} + 1)}$$

where $T_{verg}$ and $T_{conj}$ are defined in equations (5.11) and (5.12). This also explains the choice of the term "dark" time constants for $T_{verg}$ and $T_{conj}$.

The exact values of these time constants are not critical but are typically larger than time constants of the plant. In this embodiment, $T_{conj}$ is set to 15 seconds, which is within a normal range often reported in neurological studies. Of course other values of $T_{conj}$ are also applicable to the invention. The vergence time constant in biological systems is poorly documented in the literature. Apparently, $T_{verg} < T_{conj}$, which is a mathematical requirement for system stability. In the present embodiment $T_{verg}$ is selected as 5 seconds.

Figure 9:
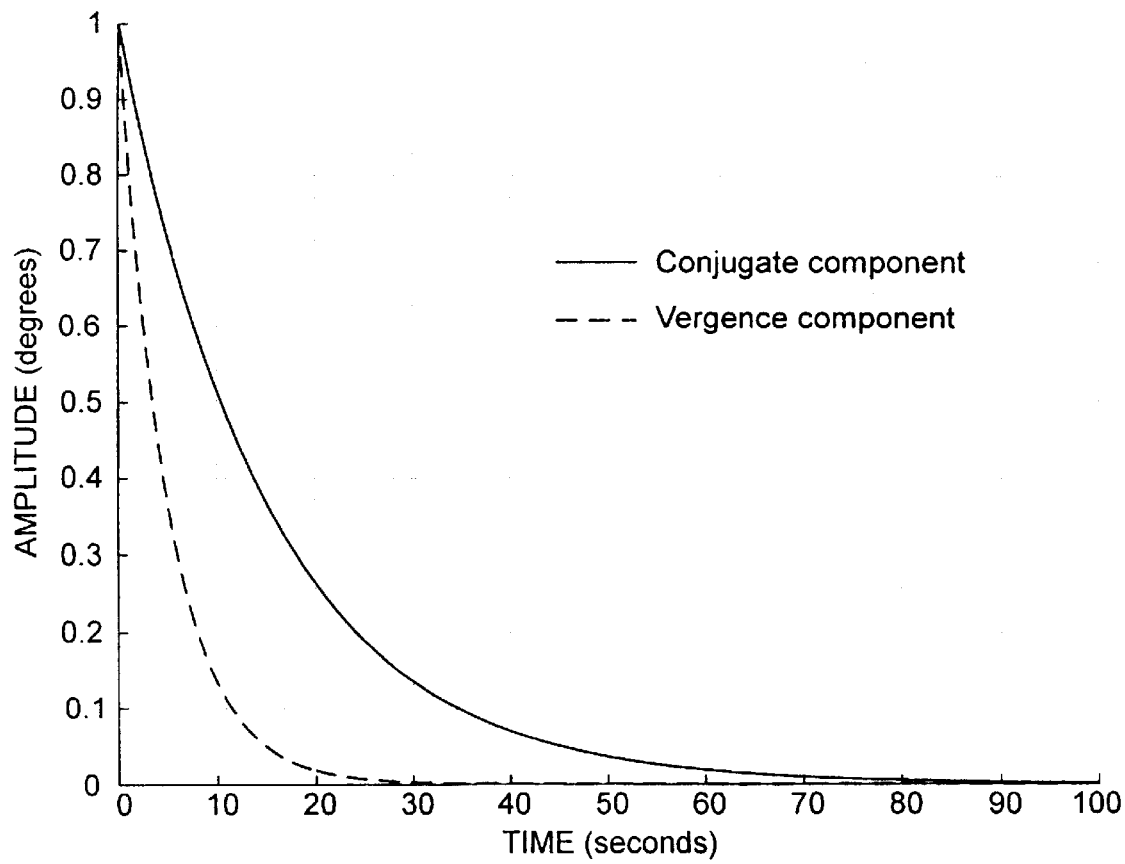
FIG. 9 is a plot of simulation results of slow phase system operation in total darkness.

From equations (5.23) and (5.24), it is apparent that the conjugate and vergent systems include a cascade of two lowpass systems. However, the term $p_1/(s+p_1)$, having a time constant in the order of 2 ms, is negligible in view of the butterfly controller time constants of 5 and 15 seconds. Accordingly, a dominant pole approximation shown below each equation is used. The large values of the dark vergence and conjugate time constants give rise to a gaze holding ability of the controller. In other words, if a light target is fixated in darkness, the states of the controller are driven to non-zero values. When the target is extinguished, the controller states gradually decay to zero. Therefore in the absence of a target, the imaging device positions return smoothly to a null position at a rate related to the dark conjugate and vergence time constants. This is a desirable feature since the imaging devices and plants are protected against jerking motions and consequent mechanical stresses. FIG. 9 shows simulation results for a slow-phase response when a target is extinguished and the system continues to operate in darkness. In order to take advantage of this feature, the controller merely requires a "no-target" signal such as constant open-loop zero inputs. Determining target visibility is a "cognitive" issue and methods of performing target extraction and determinations of retinal error are well known in the art of computer vision.

Substituting for known parameters into equations (5.14) and (5.15) one obtains values to four significant figures for d=9.9971e-01 and g=1.4497e-04; in simulations results of which are shown herein, d and g are used to full numerical resolution. $T_{verg}$ and $T_{conj}$ are highly sensitive to these parameters.

Returning to the slow-phase system operating in the presence of visual feedback, system transfer functions $E_V(s)/T_V(s)$ and $E_C(s)/T_C(s)$ are shown in equations (5.21) and (5.22). Only two parameters remain to be determined, $k_{verg}$ and $k_{conj}$. Unfortunately, the high order of antialiasing filters A(s) makes analytic treatment of these systems somewhat painstaking, so a numerical approach was used instead. Furthermore, because the conjugate and vergence systems are similar in this embodiment, only the conjugate system is explored in detail. Final results are provided for the vergence system. Design and analysis were carried out using MATLAB numerical computation software.

Figure 10:
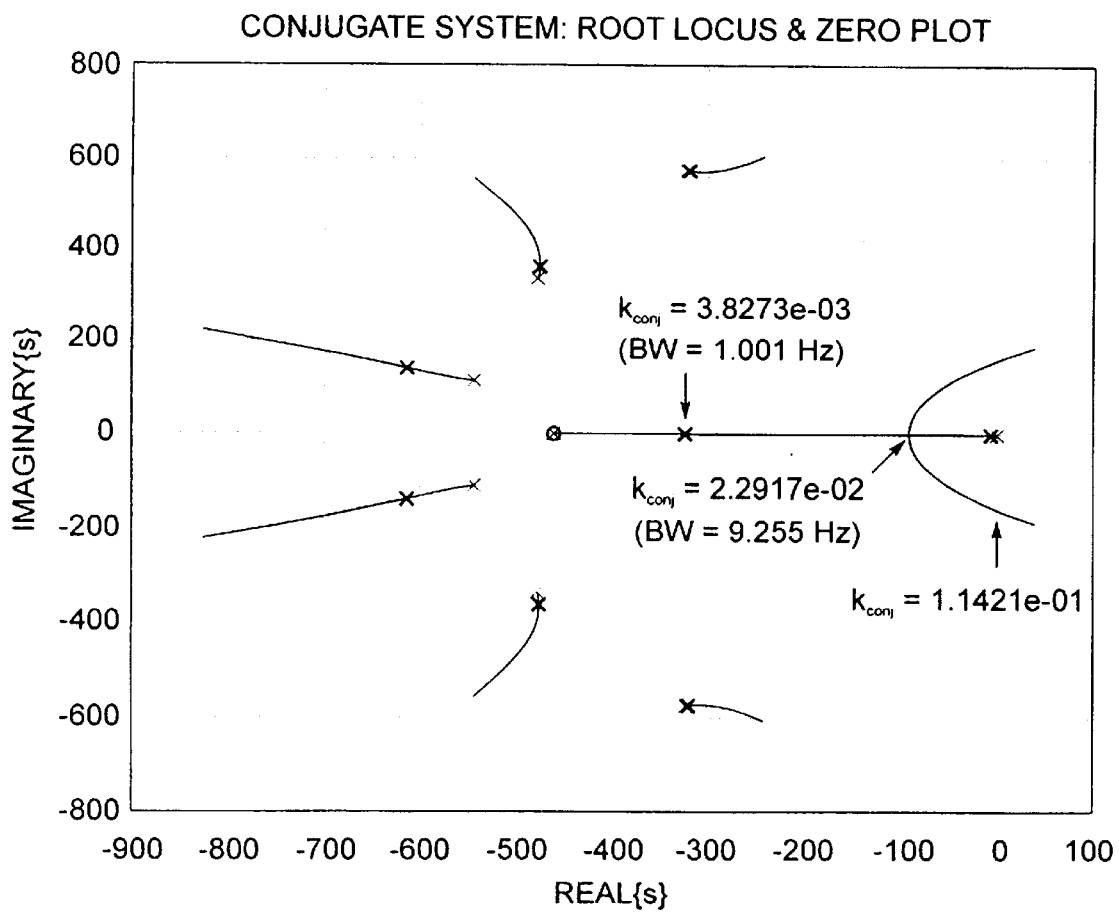
FIG. 10 is a root locus diagram of a conjugate system for use in design of a controller according to the invention.
Figure 11:
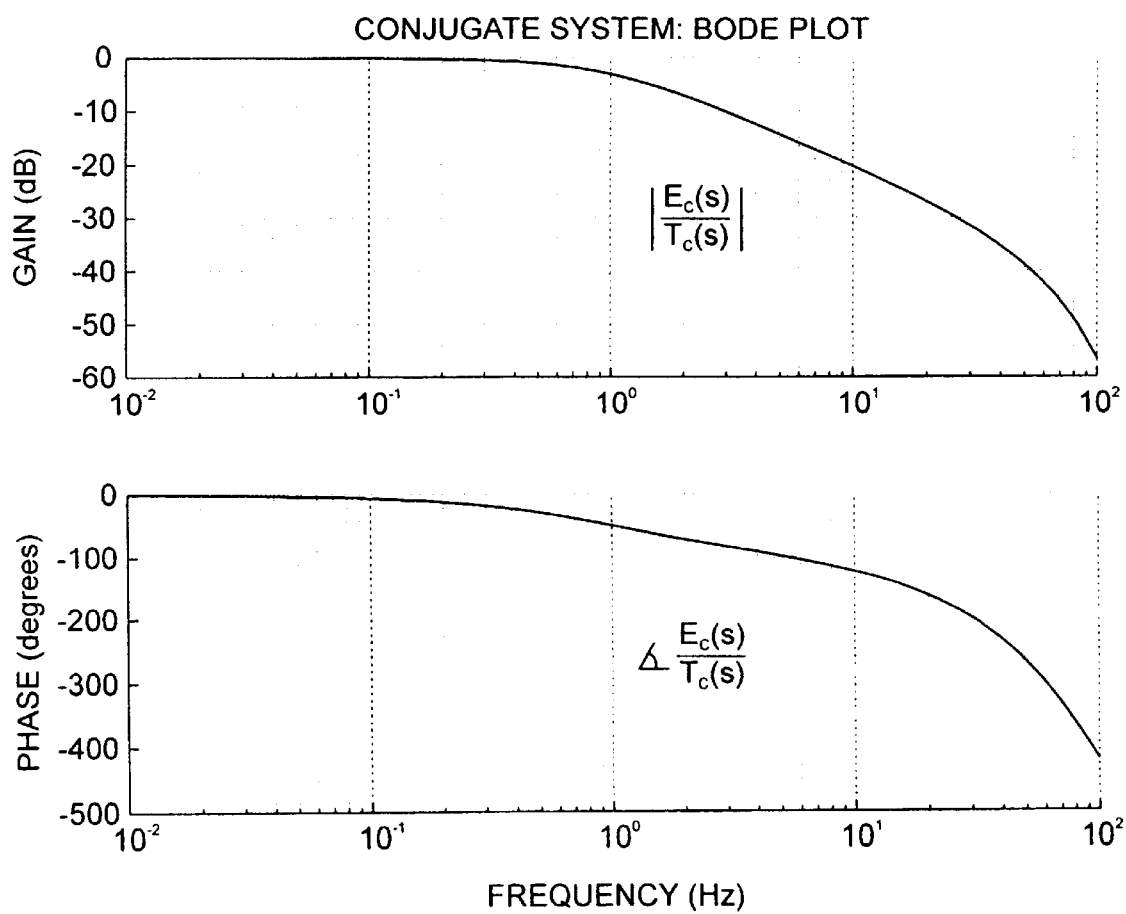
FIG. 11 is a bode plot of a conjugate system according to the invention with a tracking bandwidth of 1 Hz.

FIG. 10 shows the root locus plot of the system shown in FIG. 8(a) along with final pole/zero placements for this embodiment. There is some freedom in selecting conjugate tracking bandwidth but an upper bound is approximately 9.3 Hz where the system becomes "critically damped" when only considering the dominant poles. For the purpose of demonstration, the closed-loop conjugate bandwidth was set to 1 Hz corresponding to $k_{conj} = 3.8273 \times 10^{-3}$. The Bode plots for this system are shown in FIG. 11.

TABLE 1

Summary of the parameters used in the butterfly. This corresponds to operating the slow-phase system in total darkness without a visible target to pursue
BUTTERFLY PARAMETERS

| Symbol | Parameter | Value | Definitions |
|---|---|---|---|
| $p_1$ | Eye plant pole (double pole) | 460 rad/s | |
| $T_{verg}$ | Vergence dark time constant | 5 s | |
| $T_{conj}$ | Conjugate dark time constant | 15 s | |
| g | Cross-midline gain | $(\beta - \alpha)/(\beta + \alpha)$ | $\alpha = T_{conj} p_1/(T_{conj} p_1 - 1)\beta =$ $T_{verg} p_1/(T_{verg} p_1 - 1)$ |
| d | Model reference gain | $2/(\beta + \alpha)$ | |

The root locus and Bode plot for the vergence system are very similar to those of the conjugate system. A closed-loop vergence bandwidth of 1 Hz is obtained by letting $k_{verg} = 3.7400 \times 10^{-3}$. The resulting DC gain is 0.9661. The near-unity DC gain of the systems is due to the butterfly controller's large open-loop time constants allowing the controller to behave as a non-ideal integrator. Tables 1 and 2 summarise the parameters for the slow-phase system according to the present embodiment operating in darkness as well as with visual feedback.

TABLE 2

Summary of the parameters for the slow-phase system operating with visual feedback

SLOW-PHASE SYSTEM PARAMETERS

| Parameter | Conjugate System | Vergence System |
|---|---|---|
| Controller gain | $K_{conj} = 3.8273 \times 10^{-3}$ | $k_{verg} = 3.7400 \times 10^{-3}$ |
| Bandwidth | 1.001 Hz | 0.999 Hz |
| DC gain | 0.9887 | 0.9661 |

The Fast-Phase System: Saccadic Movement

Saccadic movements are rapid eye movements from a first eye gaze direction to a second other eye gaze direction. Since the present invention is modelled upon biological systems, implementation of saccadic or fast-phase movement of imaging devices is desirable. It is widely accepted that saccadic eye movements are generated by a local feedback loop in the brainstem, and that the eye is driven until an internally monitored "motor error" is zeroed. Since a fast-phase is executed open-loop with respect to vision, the internal efference copy of eye position is used to form the local feedback loop. An existing problem is that nobody knows where to place the feedback in modelling saccadic motion of eyes. An artificial fast-phase system according to the invention is based upon a motor-error control scheme.

Figure 12:
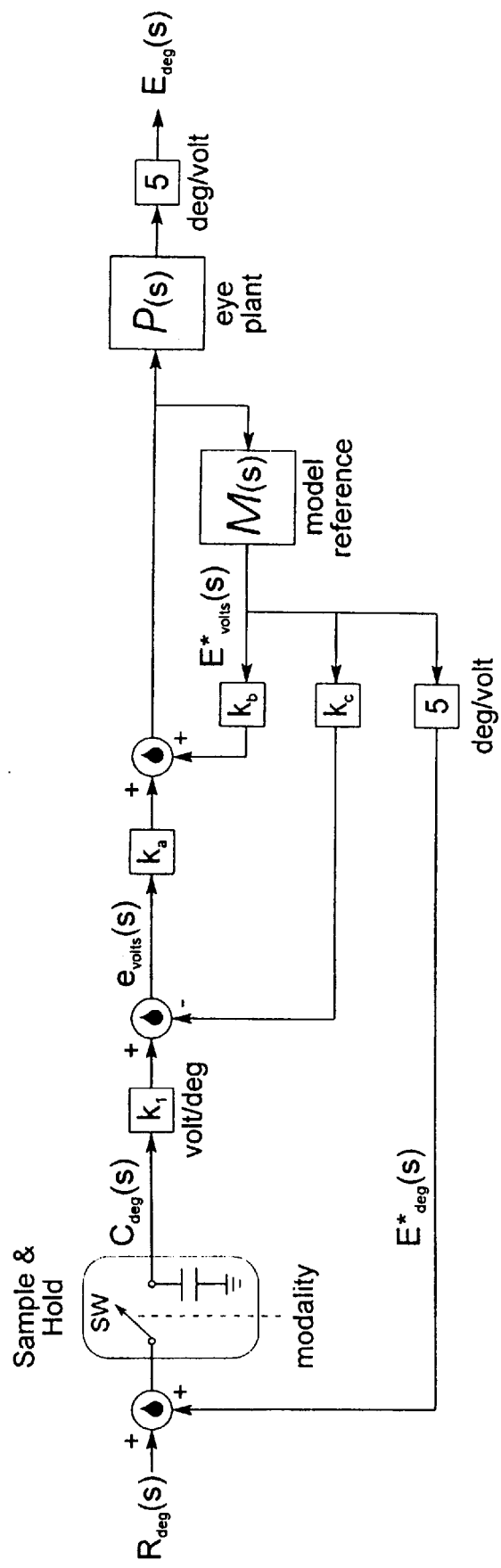
FIG. 12 is a block diagram of a system for providing fast-phase control of imaging device motion along one axis.

Referring to FIG. 12 a system according to the invention for generating fast-phase control signals is shown. The controller is intended to quickly change rotation of an imaging device, by $R_{deg}(\bullet)$, relative to the current imaging device orientation. One such system is needed for each imaging device axis of rotation. For implementation of the fast-phase, a bilateral structure used during slow-phase is dissolved and each imaging device is now controlled by the independent system remaining on each side.

The control system operates as follows. During slow-phase, switch SW of the sample-and-hold unit is closed and $C_{deg}(\bullet)$ is continually updated. It provides an estimate of the target position in space, since $R_{deg}(\bullet)$ is a function of retinal error and $E^*_{deg}(\bullet)$ is an estimate of the current eye position. When the need for a fast-phase arises switch SW opens, thereby taking a sample of the input, and causes $C_{deg}(\bullet)$ to hold a command signal. Except for block M(s), which is the only controller element that is unaltered across modalities, the rest of the controller is not active during slow-phase. Alternatively, a portion of a response from the rest of the controller is substantially damped. Thus, at the start of a fast-phase the controller assumes the configuration shown and responds to a step input, $C_{deg}(\bullet)$. The system operates open-loop with respect to $E_{deg}(\bullet)$ since there is no visual feedback and the control system relies on local feedback based on the efference copy of imaging device position. Efference imaging device position is subtracted from a command signal producing $e_{volts}(\bullet)$, a motor error driving half a butterfly controller. At the start of the fast-phase $e_{volts}(\bullet)$ represents a size of the saccade and during saccade movement, it tends to zero. Alternatively, this result is achieved without explicitly computing the step input for the saccade.

A transfer function between the fast-phase command, $C_{deg}(s)$, and an estimated imaging device position, $E^*_{deg}(s)$ when the system state, $E^*_{volts}(\bullet)$, is zero, SW is open and that $M(s)=p_1/(s+p_1)$ is as follows:

$$\frac{E^*_{deg}(s)}{C_{deg}(s)} = \frac{5k_1 k_a p_1}{s + (1 + k_a k_c - k_b)p_1} \quad (5.25)$$

Low-frequency gain of this system is $$\beta \equiv \frac{5k_1 k_a}{1 + k_a k_c - k_b} \quad (5.26)$$

which is also the same low-frequency gain as for $E_{deg}(s)/C_{deg}(s)|s=0$ since P(s) has a same DC gain as M(s). Also of interest is a transfer function shown below $$\frac{e_{volts}(s)}{C_{deg}(s)} = k_1 s + \frac{(1 - k_b)p_1}{s + (1 + k_a k_c - k_b)p_1} \quad (5.27)$$

since the error signal $e_{volts}(t)$ is useful to determine when the saccade is to terminate. Of course, other means of determining a termination condition for a saccade are also possible. When $C_{deg}(s)$ represent a saccade command in the form of a step of amplitude A degrees, $C_{deg}(s)=A/s$, the following equations describe resulting step response functions $$E^*_{deg}(t) = A\beta[u(t) - e^{-tp_1(1+k_a k_c - k_b)}], \quad \text{for } t \geq 0 \quad (5.28)$$

$$e_{volts}(t) = \frac{A\beta}{5k_a}[(1 - k_b)u(t) + k_a k_c e^{-tp_1(1+k_a k_c - k_b)}, \quad \text{for } t \geq 0 \quad (5.29)$$

where u(t) represents a unit step function. Determination of parameters $k_a$, $k_b$, and $k_c$ is now possible.

Consider an error function comparing an internally estimated fast-phase trajectory, $E^*_{deg}(t)$, to a desired goal: $\hat{e}_{deg}(t) = A\ u(t) - E^*_{deg}(t)$. $E^*(\bullet)$ is used instead of $E(\bullet)$ because it is available for signal processing and because steady-state gain between the desired goal and either of these two signals is identical. Substituting equation (5.28) for $E^*_{deg}(t)$ in $\hat{e}_{deg}(t)$ yields $$\hat{e}_{deg}(t) = A[(1-\hat{a})u(t)+\beta e^{-tp_1(1+k_a k_c - k_b)}, \text{ for } t \geq 0 \quad (5.30)$$

Because $\hat{e}_{deg}(t)$ is strictly monotonically decreasing, a fast-phase movement is terminated when the error function falls below a prescribed threshold as indicated in Design constraint 1 below. The actual threshold value is preferably normalised with respect to fast-phase height in order to maintain a same relative error amongst all fast-phases. Since $\hat{e}_{deg}(t)$ is not physically computed in the controller, relating it to motor error drive, $e_{volts}(t)$, is convenient. Using equations (5.29) and (5.30) and eliminating a common exponential term yields $$\hat{e}_{deg} = \frac{5\beta}{k_c} e_{volts} + A\left[1 - \beta - \frac{\beta}{k_a k_c}(1 - k_b)\right], \quad (5.31)$$

thereby revealing a static relationship between $\hat{e}_{deg}$ and $e_{volts}$. Design constraints such as those that follow are helpful in fixing remaining free parameters.

Design constraint 1: $e_{volts}(t)$ approaches 0 as t approaches ∞ in order to have a well behaved error function. The above constraint is easily satisfied by setting $k_b=1$.

Design constraint 2: $\hat{e}_{deg}$ proportional to $e_{volts}$ in order to facilitate saccade termination decisions. Examining equation (5.31) in light of the above restriction on $k_b$, results in $\beta=1$. It then follows from equation (5.26) that $k_c=5k_1$ and, after simplification, that $\hat{e}_{deg}=e_{volts}k_1$. It is evident that the fast-phase system drives the imaging device until an internally monitored motor error falls below a predetermined threshold.

Design constraint 3: The bandwidth of the fast-phase system is $\omega_c$. In order to provide a system meeting this constraint, the overall system transfer function is considered, as shown in equation (5.32), where $P(s)=p_1^2/(s+p_1)^2$. $k_a$ is found such that $|E_{deg}(j\omega)/C_{deg}(j\omega)|_{\omega=\omega_c}=1/\sqrt{2}$. After algebraic manipulation and parameter substitution one obtains equation (5.33). All free parameters are now accounted for and values determined therefore.

$$\frac{E_{deg}(s)}{C_{deg}(s)} = \frac{P(s)E^*_{deg}(s)}{M(s)C_{deg}(s)} = \frac{p_1}{s+p_1}\frac{E^*_{deg}(s)}{C_{deg}(s)} \quad (5.32)$$

$$k_a = \frac{\omega_c}{5k_1 p_1}\sqrt{\frac{p_1^2 + \omega_c^2}{p_1^2 - \omega_c^2}} \quad (5.33)$$

The above analysis was performed when the system begins from a zero state. This assumption is generally incorrect. When the assumption is incorrect, a further analysis establishes that the fast-phase generator will change the value of $e_{volts}(t)$ by A degrees ($k_1$ is a units-conversion factor) regardless of the initial value of $E^*_{volts}(t)$. Therefore, the above design constraints are applicable to a real fast-phase controller.

Because the fast-phase system operates without visual feedback, it is not subject to the same stability restrictions as the slow-phase system and, consequently, can operate at a much higher bandwidth. The bandwidth, $\omega_c$, is an adjustable parameter in the fast-phase system. In order not to place excessive strain on the mechanical parts of the imaging devices and associated plants, the fast-phase bandwidth is arbitrarily set to 20 Hz ($\omega_c=125.7$ rad/s). Of course, other fast phase bandwidths are also possible. A summary of parameter settings for the fast-phase system is presented in Table 3.

In this embodiment, the mechanical bandwidth of an imaging device and associated plant(s) is greater than the specified fast-phase bandwidth. Consequently, positive feedback is used to lower the system bandwidth. In the case of a sluggish imaging device and associated plant, negative feedback is used to increase bandwidth, or alternatively a different bandwidth is selected.

TABLE 3

Summary of parameters used for fast-phase control
FAST-PHASE SYSTEM PARAMETERS

| Symbol | Parameter | Value |
|---|---|---|
| $k_1$ | PSD/amp conversion factor | 331.8 mV/° |
| $\omega_c$ | Bandwidth (-3dB point) | 40 $\pi$ rad/s |
| $k_a$ | Controller gain | see Eq (5.35) |
| $k_b$ | Model reference gain | 1 |
| kc | Feedback gain | 5 kl |

Integrating Slow and Fast Phase Control Systems

Figure 13:
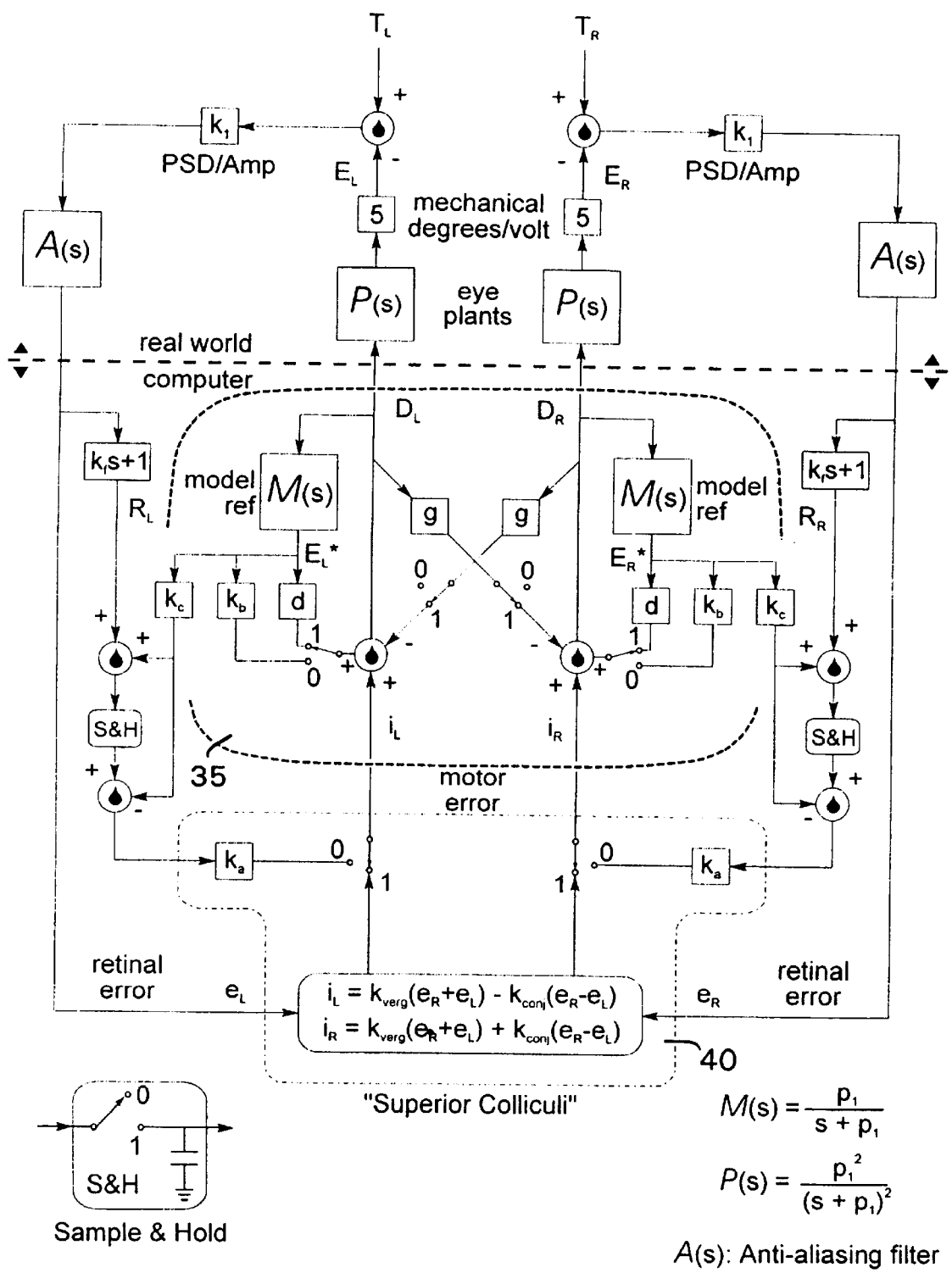
FIG. 13 is a symmetrical binocular controller according to the invention demonstrating a merger of conjugate, vergence, slow-phase, and fast-phase control within a same controller architecture.

According to the invention, the slow and fast-phase systems are not separate and distinct. According to the embodiment described above, the two systems share information in the form of a state(s) imbedded in each model reference block, M(s). Thus, information from an end of a slow-phase segment is available at the start of a fast-phase segment and information from the end of a fast-phase segment is available at the start of the slow-phase segment. It is because of this passing of information at the core of the binocular controller, the butterfly controller 35, that the co-ordination between slow and fast segments is achieved without effort. Referring to FIG. 13 the two controllers are shown fused to form a single controller unit. Alternatively, it is possible to duplicate much of each controller within each of two controllers in order to create two distinct controllers one for the slow-phase and one for the fast-phase, but the internal states in each controller would still have to be updated appropriately at each modality transition, essentially coupling the systems through initial conditions.

Elements 40 shown at the bottom of FIG. 13 and enclosed by a dashed contour denote a portion of the controller analogous to the superior colliculi. Retinal errors are separate from the fast-phase inputs symbolising the different collicular layers impinged by these signals. The retinal projections target the superficial layers, whereas the saccadic motor errors could target the deep layers. Collicular activity caused by either the slow or fast-phase systems is output on the same projecting pathways to produce a motor error drive for the butterfly controller 35.

Digital Implementation

According to an embodiment of the invention, the controller is implemented as a discrete-time system. An s-domain approach is used herein for ease of understanding. This also renders the description somewhat sampling rate independent. Though it is true that an analogue version of a signal cannot be uniquely determined from a sequence of samples, for a sufficiently high sampling rate a good approximation can be obtained by interpolating the sequence with a smooth curve. In digital control a "sufficiently high" sampling rate is expressed relative to the closed-loop bandwidth of the system and as a general rule a digital controller running at twenty times the system bandwidth will substantially match the performance of a continuous controller. Since the controller described herein operates at a rate of fifty times the closed-loop bandwidth, an analogue treatment of the controller is merited.

Surprisingly, the discrete realisation of the controller is not straightforward. It has been found that three issues need to be addressed for implementation of the butterfly controller: (i) how to implement the basic model reference loop (i.e., half a butterfly controller); (ii) butterfly controller performance at transitions between the two operating modalities, fast and slow; and (iii) implementation of the fast-phase system. Each of these issues is addressable by those skilled in the art with reference to the disclosure herein. Digital implementation problems are systematically resolved and the controller is treated in continuous time.

The equations for the slow-phase system, (5.21) and (5.22), were derived under an implicit assumption of zero initial-conditions. In other words, since M(s) is a 1st-order system its output is its state. Hence, $E_L^*(t)$ and $E_R^*(t)$ are the only states in the system and, consequently, the assumption was that $E_L^*(t_0)=E_R^*(t_0)=0$. However, as a result of switching between operating modalities, the end of a fast-phase segment generally results in a system state of arbitrary value. Effects of non-zero initial conditions on a subsequent slow-phase segment, are determined in order to correct, where necessary, the parameters or the equations set out above. Initial-condition effects on fast-phase segments need not be addressed because of the way that the fast phase system operates.

Figure 14:
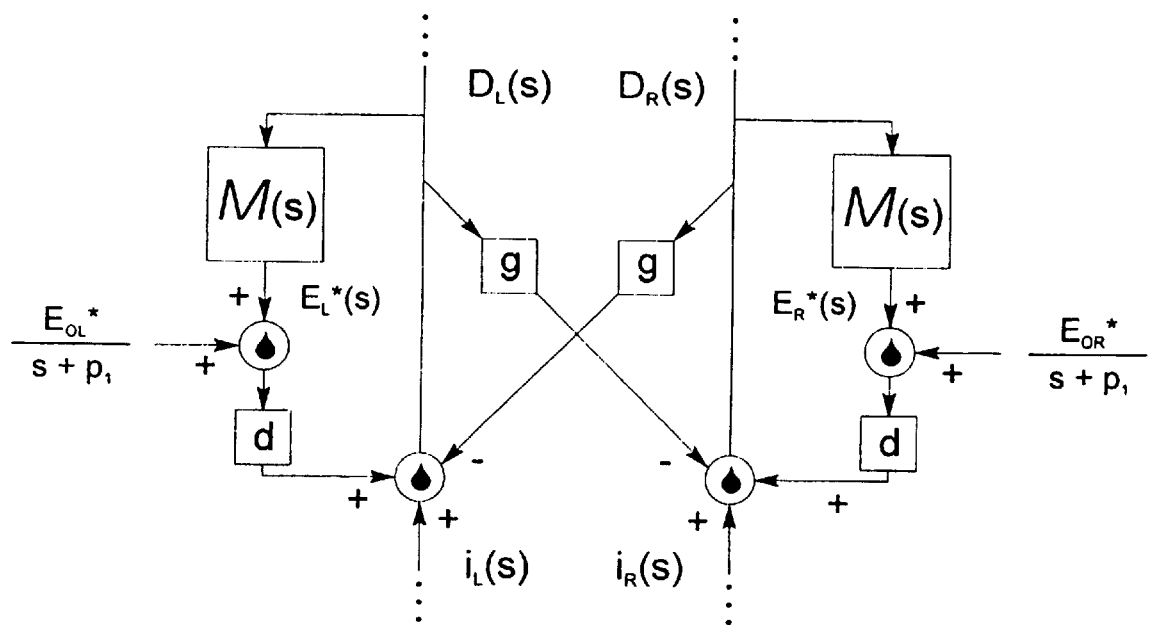
FIG. 14 is a diagram of a butterfly core according to the invention wherein initial conditions are incorporated into controller design.

Referring to FIG. 14 slow-phase initial conditions are shown incorporated into the butterfly controller. Because the slow-phase system is linear the principle of superposition may be applied to sum the forced imaging device response and the transient effects of the initial conditions to yield the total imaging device movement. Results in terms of vergent and conjugate responses are as follows:

$$E_V(S) = \frac{10k_{verg}k_1A(s)P(s)}{1+g-dM(s)+10k_{verg}k_1A(s)P(s)}(T_R(s)+T_L(s)) + \frac{5d}{p_1}\frac{P(s)M(s)}{1+g-dM(s)+10k_{verg}k_1A(s)P(s)}(E^*_{OR}+E^*_{OL})$$
(5.32)

$$E_C(S) = \frac{10k_{conj}k_1A(s)P(s)}{1-g-dM(s)+10k_{conj}k_1A(s)P(s)}(T_R(s)+T_L(s)) + \frac{5d}{2p_1}\frac{P(s)M(s)}{1-g-dM(s)+10k_{conj}k_1A(s)P(s)}(E^*_{OR}+E^*_{OL})$$
(5.33)

Initial conditions can have a significant effect on resultant eye movements. In fact in Galiana, H. L., "Oculomotor Control," in *Visual Cognition and Action,* D. N. Osherson, S. M. Kosslyn, and J. M. Hollerback (Eds.), MIT press, Cambridge, Mass., Chapter 4, pp. 243–283, 1990. ISBN 0-262-15036-0, it is demonstrated that frequent resetting of initial conditions through nystagmus significantly alters the slow-phase envelope profile during angular vestibulo-ocular reflex (VOR). This results in a phenomenon known as velocity storage. It is possible for a bilateral controller to operate primarily with transient responses and never reach a steady state.

Vertical Eye Movements

Thus far only horizontal imaging device movements have been considered. Of course, a controller according to the invention is useful in controlling imaging device motion in three-dimensions as well.

Figure 15:
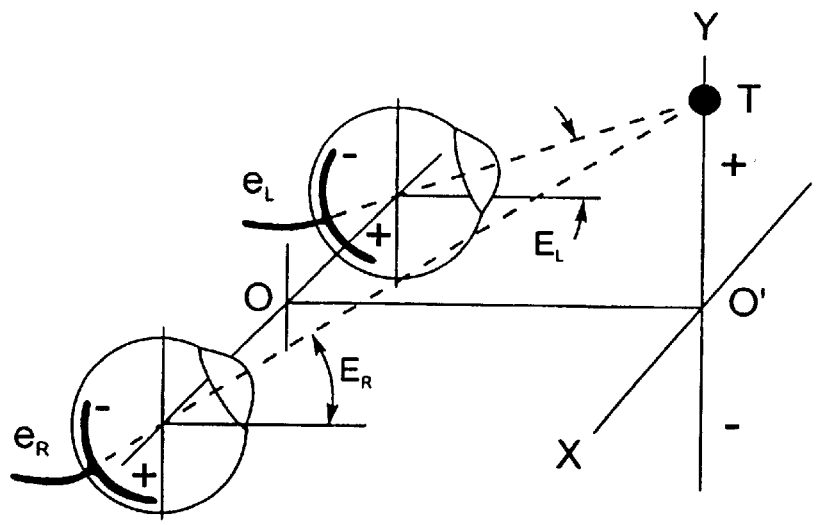
FIG. 15 is a schematic representation of two eyes, shown in cross section, fixating a vertically displaced target.

Vertical imaging device movements as described herein are referred to a horizontal plane located midway through the imaging devices field of view. As before, imaging device movements relative to this plane are assigned a same polarity. FIG. 15 shows two eyes observing a vertically displaced target. The co-ordinate system for imaging device movements is defined in accordance with the reference plane described above. Individual imaging device positions are used to express conjugate ($E_C$) and vergent ($E_V$) components as shown in the following equations $$E_C = \frac{1}{2}(E_R + E_L)$$ (5.36)

$$E_V = |E_R - E_L|$$ (5.37)

$$E_V = |E_R - E_L|$$ (5.37)

Although these equations are different from those corresponding to the case of horizontal imaging device movement, geometrically they represent substantially same quantities: the conjugate component represents the vertical imaging device rotation of a cyclopean eye (at O), and the vergence component represents the angle subtended by the lines of sight. For vertically aligned imaging devices, as shown here, $E_V=0$. $E_V$ is evaluated with an absolute-value function in order to maintain a positive vergence angle; negative values arise when the right imaging device is higher than the left imaging device.

Here, the controller common mode is associated with conjugate response and the difference mode is associated with the vergence response. This correspondence is exploited by combining the retinal errors as follows:

$$i_L = k_{conj}(e_R + e_L) - k_{verg}(e_R - e_L)$$ (5.38)

$$i_R = k_{conj}(e_R + e_L) - k_{verg}(e_R - e_L)$$ (5.39)

These are essentially the same equations used in the horizontal case where constants $k_{conj}$ and $k_{verg}$ have been interchanged. Thus, the controller for vertical eye motion is substantially identical in form to that used for horizontal imaging device control (shown, for example, in FIG. 13), except for the controller-constant interchange mentioned above.

Integrated Three-dimensional Imaging Device Motion Controller

In integration of the controller to support movement of an imaging device in multiple planes, independent control for each plane is provided by duplication of significantly same controller described above. Cross talk between the horizontal and vertical systems is possible at the sensory level only, in that the vertical system responds to inadvertent vertical eye deviation caused by horizontal eye movement, and vice versa. Alternatively, cross talk implemented at other levels is possible in some instances, and may even be a requirement given geometric restrictions for 3D rotations. The modality of the controller is universal; one system cannot be operating in slow-phase while the other is operating in fast-phase. Controller modality is determined as described by the four points below, using horizontal and vertical control for illustrative purposes.

N° 1. At system start-up the modality is set to slow-phase. This is an arbitrary choice. For example, the system could start up in fast phase with a desired predetermined gaze orientation instead.

N° 2. While the system is in slow-phase a vectorial representation of the retinal error is monitored. The fast-phase modality is invoked and latched whenever the magnitude of the vector exceeds a threshold relating to a size of a "fovea." Often, the "fovea" size is an arbitrary size selected based on functionality of the vision system. The process is described as follows.

i) An auxiliary retinal error is computed by adding a derivative component to an original error as follows: $\epsilon_{ij} = (1+k_{ft}s)e_{ij}$, where i=L, R denoting left and right imaging device; j=H, V denoting horizontal or vertical system, and s is the Laplace variable. $e_{ij}$ is the same $e_L$ and $e_R$ mentioned previously in the text but is now augmented with a delimiter, j, identifying the system to which the error corresponds. The inclusion of retinal slip is consistent with the notion that physiologically both position and velocity error contribute to triggering a fast-phase response.

ii) The horizontal and vertical auxiliary retinal errors are added vectorially to produce a radial auxiliary retinal error for each imaging device. The magnitude of this error is $\zeta_i = \sqrt{\epsilon_{iH}^2 + \epsilon_{iV}^2}$ where i=L,R.

iii) The modality is set to fast-phase when either of the auxiliary radial errors exceeds a threshold, i.e., whenever $\zeta_i > T_{fast\ on}$, for either i=L,R. Formulation of auxiliary radial error effectively defines a circular "fovea," of radius $T_{fast\ on}/k_1$ degrees, at the centre of each "retina." An arbitrary foveal zone is created by appropriately defining $\zeta_i$. Of course, the size of the foveal zone is determined based on a particular application and physical limitations of the vision system.

N° 3. Once the system is in fast-phase each bilateral controller is decoupled, so that left- and right-hand sides work independently producing four separate controllers. Each controller executes an open-loop re-orientation of an imaging device that terminates once a given percentage of the fast-phase step is executed by each imaging device. The process is as follows.

i) Upon entering fast-phase, the required corrective step size is computed using: $R_{ij}=(1+k_f s)e_{ij}$, where i, j, and s have the same definitions as above. This quantity is stored. Retinal slip is included in order to predict and compensate for target position and motion.

ii) The stored horizontal and vertical fast-phase step sizes are added vectorially to produce a radial saccade amplitude. The magnitude of this step is $\rho_i=\text{sqrt}(R_{iH}^2+R_{iV}^2)$, where i is as above.

iii) The fast-phase modality is released when the instantaneous radial fast-phase trajectory equals, or exceeds $(1-T_{fast\ off})\times 100\%$ of $\rho_i$, for each imaging device.

N° 4. Once the fast-phase modality is terminated slow-phase resumes, and the controller is placed into a refractory period where it is forced to remain in slow-phase for a fixed period of time, $t_{refract}$. After the refractory period has elapsed normal slow-phase operation resumes as in N° 2 above. The refractory period, when used, prevents system instability by allowing sluggish components within the controller to register the effects of a rapid eye movement recently executed. Alternatively, when the refractory period is substantially short, it is preferred that another method of preventing system instability be used.

Because the fast-phase termination point is normalised relative to its amplitude, all fast-phase segments last the same length of time. However, the residual retinal error varies with step size (a 5% residual of a 1° step is smaller than a 5% residual of a 10° step). In order to avoid perpetual chattering between the two modalities, it is important that in the worst case, for the largest expected fast-phase step, the fast-phase "on" threshold is chosen to be larger than the residual error at the end of a fast-phase. In other words, a fast-phase preferably terminates such that it places the controller in a position where it naturally begins to operate in slow-phase. Of course, the refractory period, when not substantially short, guarantees that slow-phase operation always follows a fast-phase segment. Table 4 presents the remainder of the parameters defined for the three-dimensional controller; some are arbitrarily chosen, such as $T_{fast\ on}$ and $T_{fast\ off}$, whereas others are selected to provide desired controller performance.

TABLE 4

Summary of the parameters used by the binocular pursuit system
BINOCULAR CONTROLLER PARAMETERS

| Symbol | Parameter | Value |
| --- | --- | --- |
| $k_1$ | PSD/Amp conversion factor | 331.8 mV/° |
| $k_{ft}$ | Retinal slip velocity gain; to monitor tracking performance | 3e-03 |
| $k_f$ | Retinal slip velocity gain; to setup fast phase goal | 3e-03 |
| $T_{fast\ on}$ | Fast phase on threshold (absolute, fovea motor error size) | $2.0 * k_1$ |
| $T_{fast\ off}$ | Fast-phase off threshold (relative residual error) | 5% |
| $t_{refract}$ | Fast-phase refractory period | 30 ms |

The present embodiment provides an integrated controller for gaze control in a binocular vision system. The integration occurs at two levels. First, separate slow and fast-phase systems are not identifiable since a single controller generates both dynamics by changing its topology—gain parameters. Secondly, both the conjugate and vergent components of imaging device movement are co-ordinated simultaneously. Modifying gain parameters as used herein and in the claims that follow includes setting some of the gain parameters to zero (0) in order to eliminate effects of some paths within the controller.

The controller is organised in such a way that information is shared in a "core" butterfly controller 35 allowing automatic self-co-ordination of imaging device movements. The controller is simple, preferably having only as many states as are imbedded in the models of the imaging device plants. Hence, computational demands are low; however, modality switching typically produces complex imaging device trajectories because of effects of initial conditions. In order to avoid chattering between the slow and fast modalities, switching parameters are carefully chosen. This is apparent to those of skill in the art based on the present disclosure.

Experimental Results

A prototype of the invention was produced in order to co-ordinate imaging device movements of a system as described above. The prototype was tested and simulated. Experimental results and those of simulations are compared. Some individual aspects of the controller are evaluated as is general controller performance.

Because the invention is independent of a target identification algorithm, a prototype of the invention was built using imaging devices that limit a need for such an algorithm by using a point target. The imaging devices comprise a dual-axis position sensing detector (PSD) using lateral-effect photo-diode technology. For each axis, the PSD and signal conditioning amplifiers provide the co-ordinates of the point target on the detector surface relative to its centre (see below for details).

The transimpedance amplifier limits the bandwidth of the detector to 5 kHz, which is still significantly higher than the bandwidth of the control system (<25 Hz); hence, the PSD/amp combination are treated as a static gain. Though the "retina" is technically afoveate, the centre of the optical sensor functionally defines a fovea since retinal error is substantially zero thereabout.

Referring to FIG. 2 a schematic representation of an imaging device and an associated target positioning system is shown. The controller was tested on a mechanical eye. The ball of the eye consists of a plastic sphere 23 (Ping-Pong ball, 38 mm Ø) and houses the artificial retina R and a wide angle lens 21 with a focal length of 20 mm from a Fuji Quick Snap™ disposable camera. The lens 21 comes equipped with a pin-hole aperture which is removed in order to improve its light gathering efficiency. The "retina" R is positioned at the focal distance of the lens 21. The four PSD sensor wires 25 travel on the inside of the sphere 23 and emerge adjacent to the lens 21. Once outside the eye cavity, the wires 25 pair off appropriately (X1 with X2, etc.) and are routed as twisted pairs toward a connector interfacing with the signal conditioning amplifiers 26. In order to allow horizontal and vertical rotation of the eyeball two perpendicular tendon pairs 24 (only one pair is shown) comprising steel spring wire, 152 mm Ø are attached to the sphere 23 such that their orientation coincides with the axes of the PSD. Each tendon pair 24, in the X and Y-planes, is attached to a pulley driven by its own galvanometer (galvo) 22 giving the imaging device a range of motion in each plane. Each galvo 22 is driven by a dedicated amplifier/PID-servo module so that galvo control is closed-loop; the module also conveniently outputs the instantaneous galvo shaft position.

The control system is implemented in discrete time, running at a sampling rate of 1 kHz. Naturally, analogue signals such as retinal errors are sampled. According to the Nyquist sampling theorem it is necessary to bandlimit these signals to less than half the sampling frequency. To this end, 6th-order Bessel filters, having a −3 dB cutoff frequency of 55 Hz are used.

In use, a computer, at the heart of the system, positions a laser point target on the screen by commanding targeting galvos 29 with signals $T_x$ and $T_y$ via galvo amplifiers 31. For each axis, the PSD (UDT Sensors, DL-10) produces two photocurrents, $(Ix_1, Ix_2)$ and $(Iy_1, Iy_2)$, which are a function of the position and intensity of the centroid of the light distribution on the detector surface. The signals from the PSD are amplified and normalised by transimpedance amplifiers 26 (UDT Instruments Model 301DIV) and are then anti-alias filtered at filters 28 to produce a retinal error ($R_x$, $R_y$) along each axis of the detector. The retinal errors are then brought into the computer, via two internal data acquisition cards (Burr Brown PCI-602W) arranged in a master-slave configuration. The computer, implementing a control algorithm, outputs galvo command signals $E_x$ and $E_y$ to galvos 22 causing the eye to rotate in order to centre the image of the target at the centre of the PSD.

Slow-Phase Motion

A frequency response of the conjugate pursuit system was determined. $E_L$ and $E_R$ are referred to as "true" imaging device positions since they are physically measured quantities. However, the imaging devices are manipulated by wire "tendons" 24, which are capable of twist and slack, particularly for large oblique imaging device deviations. Such variable mechanical coupling between the galvo and imaging device results in $E_L$ and $E_R$ being estimates of the actual imaging device position. True imaging device position, in general, is not determinable from the experimental apparatus and the only means of assessing tracking performance was by monitoring retinal error.

In this experimental paradigm a vertical position of the laser target is fixed at mean vertical imaging device level, while a dynamic signal analyzer controls its horizontal position (SIG OUT). A swept-sine technique is used whereby the target is displaced sinusoidally with changing frequency. During the sweep, the analyzer determines the dynamic output/input relationship (CH2/CH1) of the system under test. Note that CH1 and CH2 measure instantaneous galvo shaft positions reported by the galvo amp/PID-servo modules. Dynamics of the target positioning system are taken into account during measurement and are eliminated in the analysis. This is not the case when the target command signal is taken as a system input.

The extent of the horizontal target sweep is kept small for two reasons. Firstly, in practice the two sides of the bilateral controller are not perfectly balanced. Thus, a vergence stimulus will produce conjugate eye movement (and vice versa). For a conjugate study, then, it is desirable to stimulate the system such that the vergence angle remains constant. This generally requires that the target move along a horopter, which was impossible because of the flat target screen being used. However, a small target displacement approximates a constant-vergence stimulus because the target distance from the imaging devices (800 mm) is much larger than the distance (72 mm) between imaging devices. Secondly, large repetitive imaging device deviations, 90% of range of motion, do not have a one-to-one mapping with retinal error, but that for small rotations a relationship is almost linear. For the extent of the horizontal target displacement used in this experiment a horizontal vergence component was observed measuring 6% of the conjugate response (peak-to-peak values measured, at 500 mHz). It is not possible to tell, from this measurement, what portion of the vergence response is an undesired cross-talk due to controller asymmetry and what portion is a normal response due to excitation of the vergence mode by the stimulus.

Figure 16:
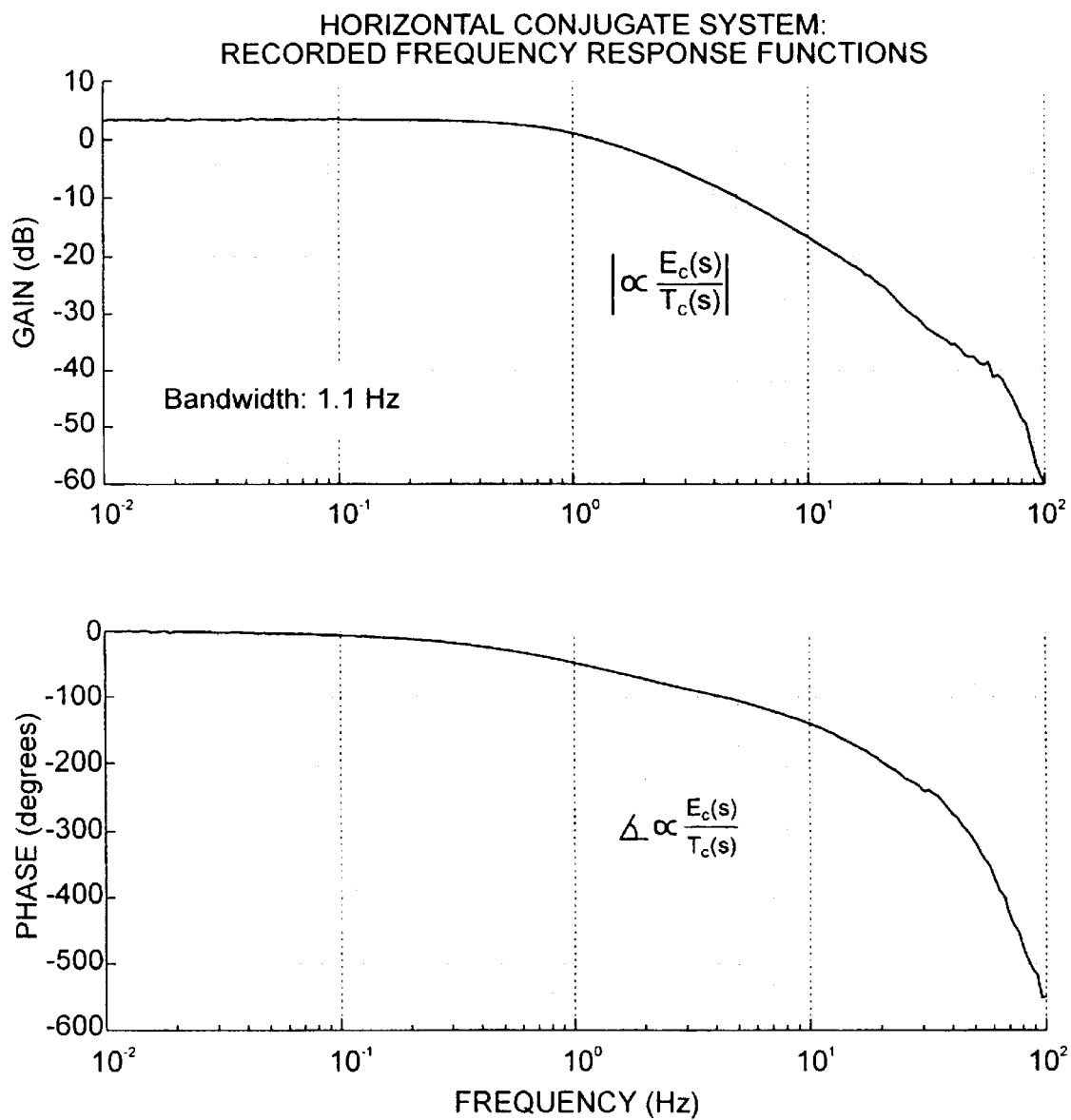
FIG. 16 is a graph of measured frequency response functions of horizontal pursuit conjugate component of a controller according to the invention.

Referring to FIG. 16, an experimental frequency response of the horizontal conjugate pursuit system is shown. Because of the recorded units, volts instead of degrees, the gain portion of the frequency response is correct to within a scale factor. Comparing results with FIG. 11, the design goal, the bandwidth of the horizontal pursuit system meets design parameters. The larger phase shift beyond 10 Hz is consistent with the fact that the actual imaging device plant is of higher order than its representation in the controller.

Because of limitations of the system used for testing the prototype, vergence was characterized using a step input. The controller motor drives, $D_L$ and $D_R$, were used to compute a vergence output $(D_V \eta D_R + D_L)$. Because the motor drives precede the imaging device plants, the resultant frequency response represents an accurate imaging device response up to the plant bandwidth (47 Hz), where an error of −3 dB results.

Figure 17:
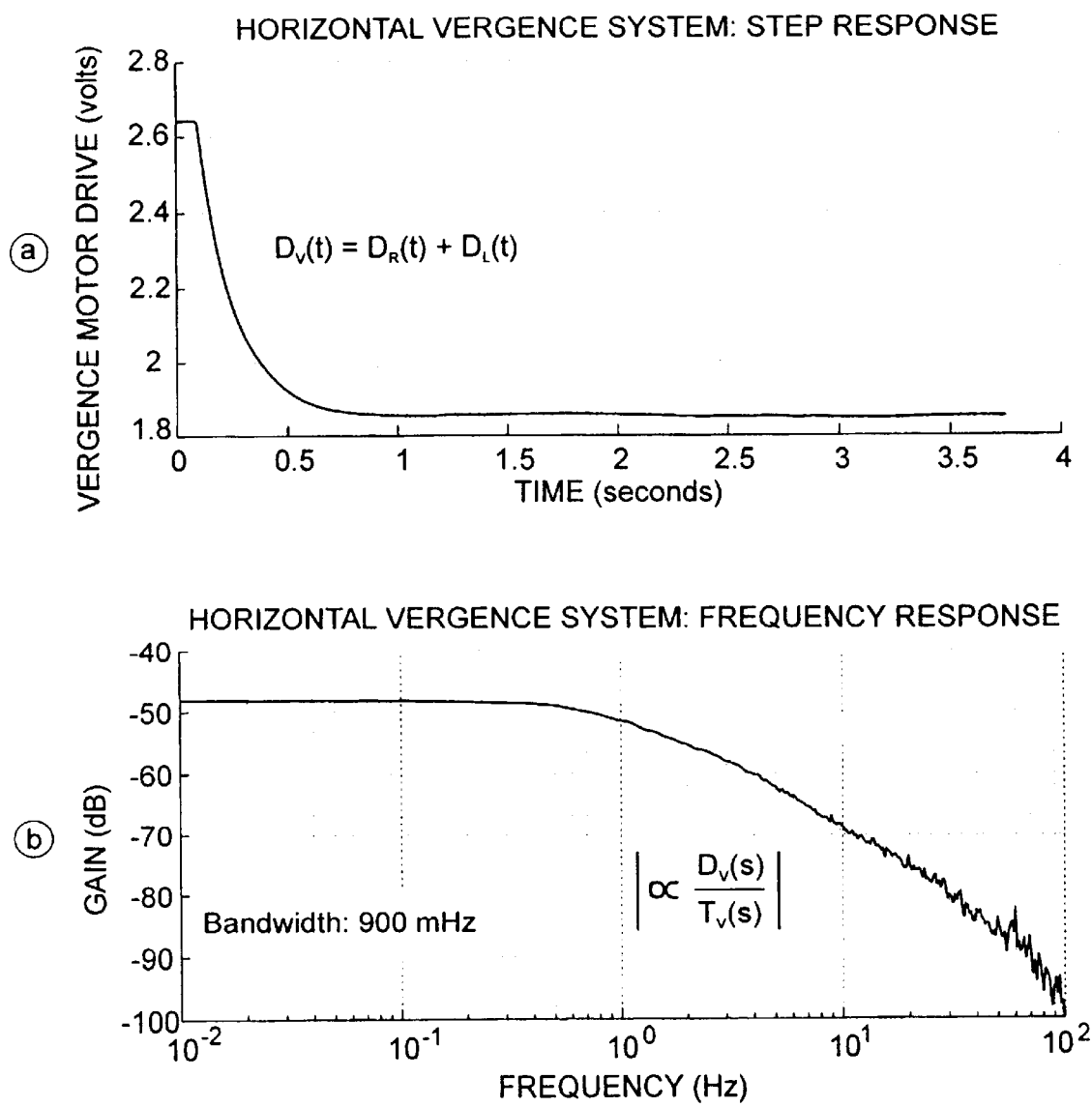
FIG. 17 is a graph of a measured step response of a vergence component of a horizontal pursuit system according to the invention.
Figure 18:
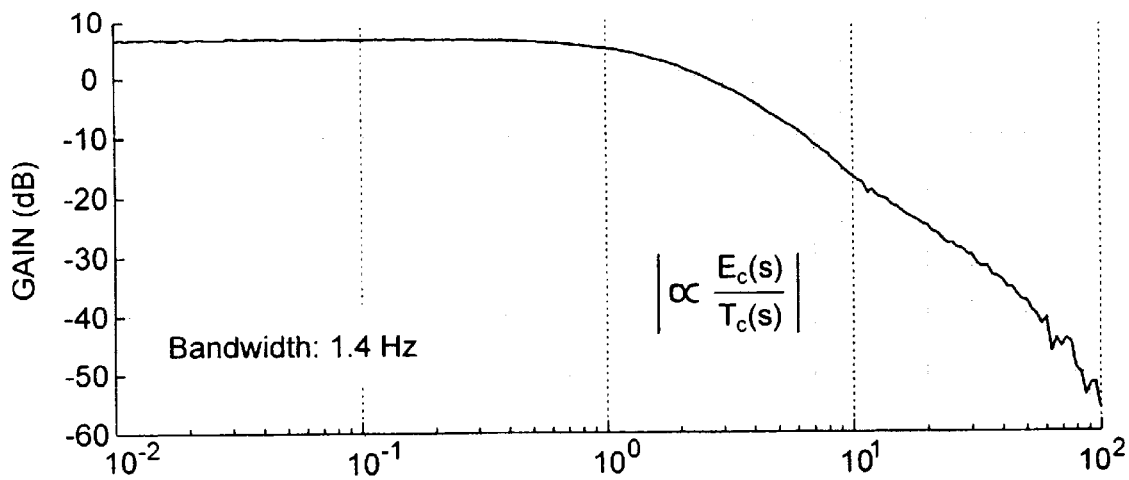
FIG. 18 is a graph of measured frequency response functions of vertical pursuit conjugate component of a controller according to the invention.
Figure 18:
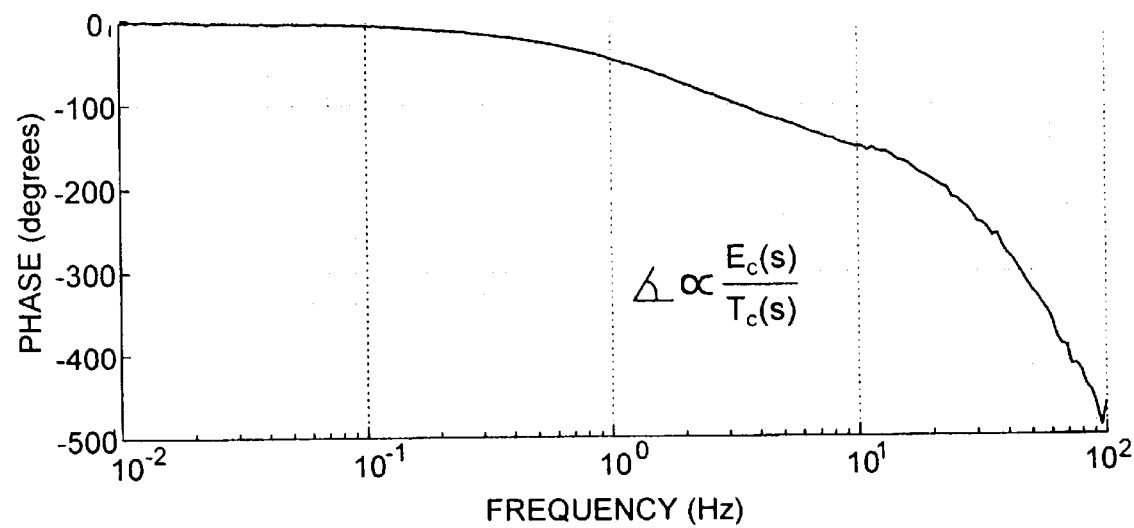

FIG. 17($a$) shows a vergence step response function of the horizontal pursuit system. In the experiment, measured conjugate response (peak-to-peak) was determined to be 7% of the vergence step amplitude. In order to determine the frequency response, the step response is (i) differentiated, to produce the impulse response function, (ii) zero-padded to increase the spectrum resolution, and (iii) Fourier-transformed to yield the frequency response function, as shown in FIG. 17($b$). Because of the units of measurement, and the fact that the area of the impulse response function is not normalized to the system's DC gain, the low-frequency portion of the frequency response function (<47 Hz) is correct to within a scale factor. The bandwidth of the vergence response is 900 mHz, which is comparable to the design goal.

An examination of simulation and experimental results for target tracking within a plane and more specifically of conjugate motion is presented below. Target movement is considered along the horizontal axis.

Figure 19:
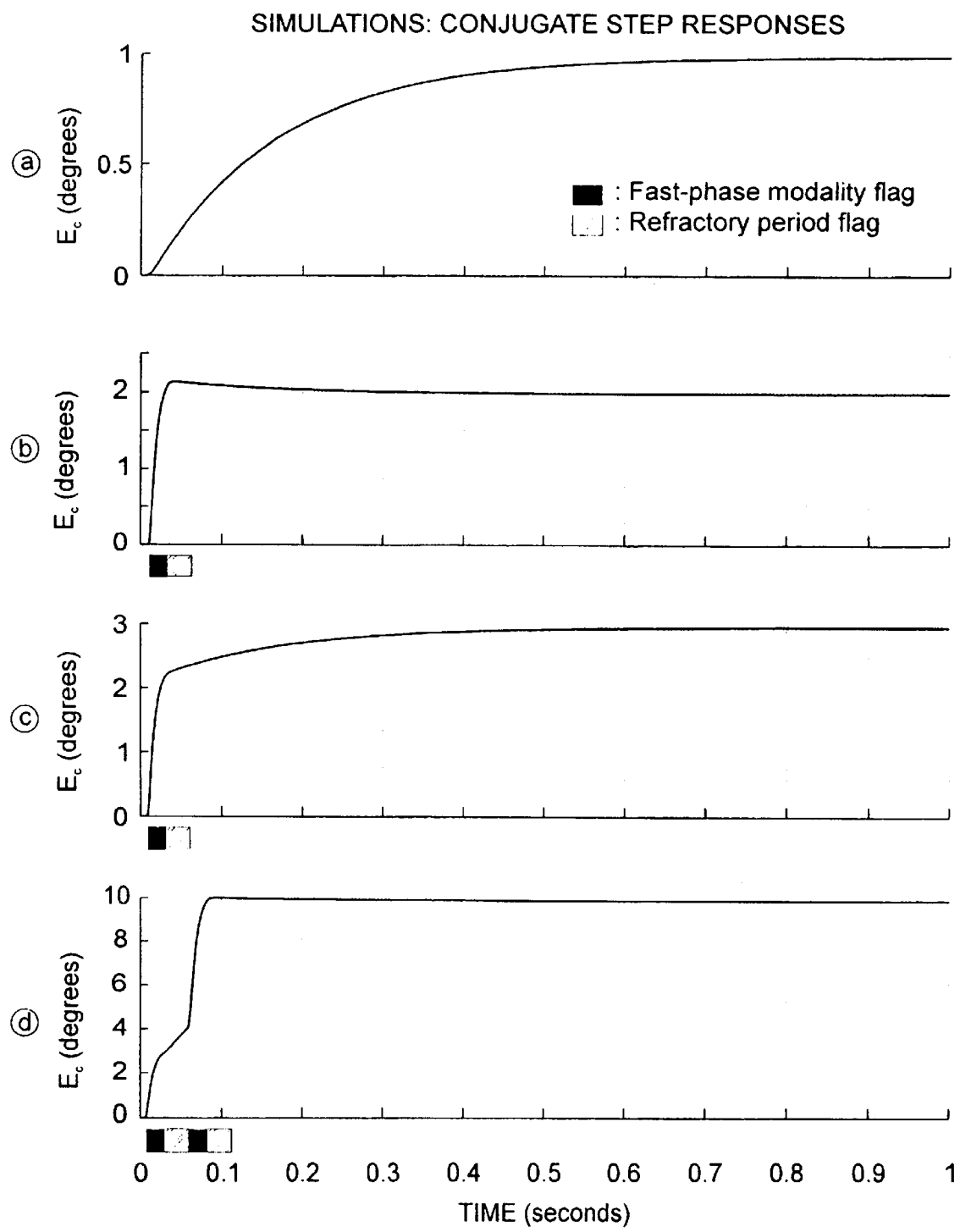
FIG. 19 is graphs of simulated responses for a conjugate target motion of increasing amplitude.

FIG. 19 shows simulation results for conjugate target steps; vergence drive is zero. In FIG. 19($a$), displaced target remains within the foveal (motor-error) zone. Since a fast phase is not required, the target is stabilised using only the slow-phase modality. Both ($b$) and ($c$) illustrate small target steps in which a single fast-phase is sufficient to foveate the target. Post saccadic drift following each fast-phase segment causes the eyes to coast toward the target. The high operating bandwidth of the fast-phase modality is clearly demonstrated by step-like segments. In ($d$) a large target step requires two fast-phases in order to reduce retinal error. Note that the corrective (2nd) fast-phase places conjugate eye position squarely on target, but that subsequent slow-phase operation gradually displaces the eye to the slow-phase steady-state level.

For step targets, controller parameters $k_{ft}$ and $k_f$ play a significant role at the start of the step where the retinal slip is large. Essentially, $k_{ft}$ determines the fast-phase-trigger sensitivity to retinal slip velocity, and $k_f$ is intended to compensate for some of the filtering due to the anti-aliasing filters. Both parameters were set such that step-targets of small amplitude could be acquired with a single fast-phase. Because of modality switching the effects of $k_{ft}$ and $k_f$ on the step response are non-linear. Furthermore, changing $T_{fast\ on}$ requires that these parameters be adjusted as well. The refractory period, in this particular case, is shown for the sake of generality; the period may be set to zero without destabilizing the system. With no refractory period, however, back-to-back fast phases are separated by a one-sample slow-phase segment that is needed to visually sample the world in order to determine the next fast-phase goal. A non-zero refractory period is useful for limiting the number of possible fast-phases in a given period of time. In biological systems the fast-phase refractory period is in the order of 50 ms.

Example (d) contrasts somewhat with observations made in biological systems. In the case of double-saccade target acquisition by a biological vision system, the primary saccade typically falls short of the goal by about 10%. This is not the case here; the reason for the different behaviour being the anti-aliasing filters interacting with the $T_{fast\ on}$ threshold. That is, because the fast-phase 'on' threshold is fixed, increasingly larger target steps produce greater underestimates of the saccadic goal. Parameter $k_f$ compensates for some of the underestimate, but only for small target displacements. This highlights the value of careful selection of filters for use with the present invention.

Figure 20:
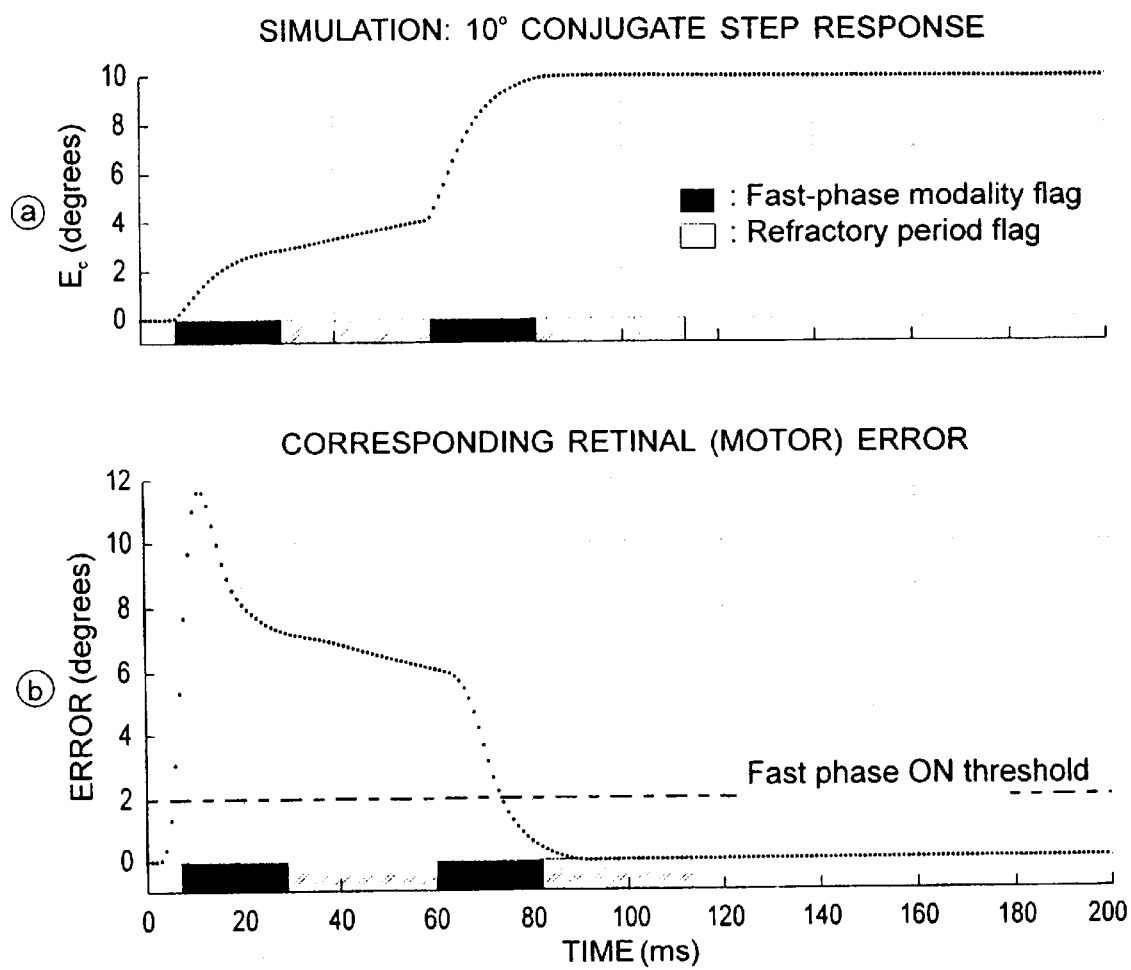
FIG. 20 is a graph of a first 200 msec of conjugate step response due to a 10 degree target jump.

FIG. 20 shows a close-up view of the last example in FIG. 19, as well as the signal used to determine the controller modality. Note in (a) the smooth transitions between the two controller modalities; there are no discontinuities in eye position. FIG. 19(b) illustrates that fast-phases are triggered as long as the retinal motor error of either imaging device is greater than $T_{fast\ on}$.

In this embodiment, there are three significant parameters to which the controller is sensitive: (i) variations in the plants, (ii) variations in the anti-aliasing filters, and (iii) variations in the PSD/Amp gain, $k_1$. Here, both the slow- and fast-phase systems operate below the mechanical bandwidth of the imaging device plant. Hence the cancellation of a plant pole is not crucial and consequently the sensitivity to plant variations is of little concern. Similarly, the high bandwidth of the anti-aliasing filters desensitizes the controller with respect to these filters. This leaves $k_1$, which is the parameter to which the controller is most sensitive. Besides influencing the bandwidth of the slow- and fast-phase systems, $k_1$ appears as a scale factor in each system's transfer function(s). In some system designs, it is necessary to reset $k_1$ periodically due to drift. For example, a parameter variation could manifest itself as excessive under/overshoot following a fast-phase. Of course, a non-zero refractory period provides some robustness against parameter variations causing this effect.

In a further experiment, combined conjugate and vergence movements are analysed. The target is made to oscillate at 4/6 Hz along the horizontal axis. A card, intercepting the target laser beam, is brought nearer to the eyes. Data recording commences and shortly after the card is dropped. Because the laser beam emanates from below the imaging devices and projects steeply onto the screen, the approaching card causes both substantial downward imaging device rotation and horizontal vergence. Furthermore, if the beam does not project midway between the eyes a bias in horizontal conjugate eye position also results. Thus when the card is dropped 2D imaging device rotation occurs.

Figure 21:
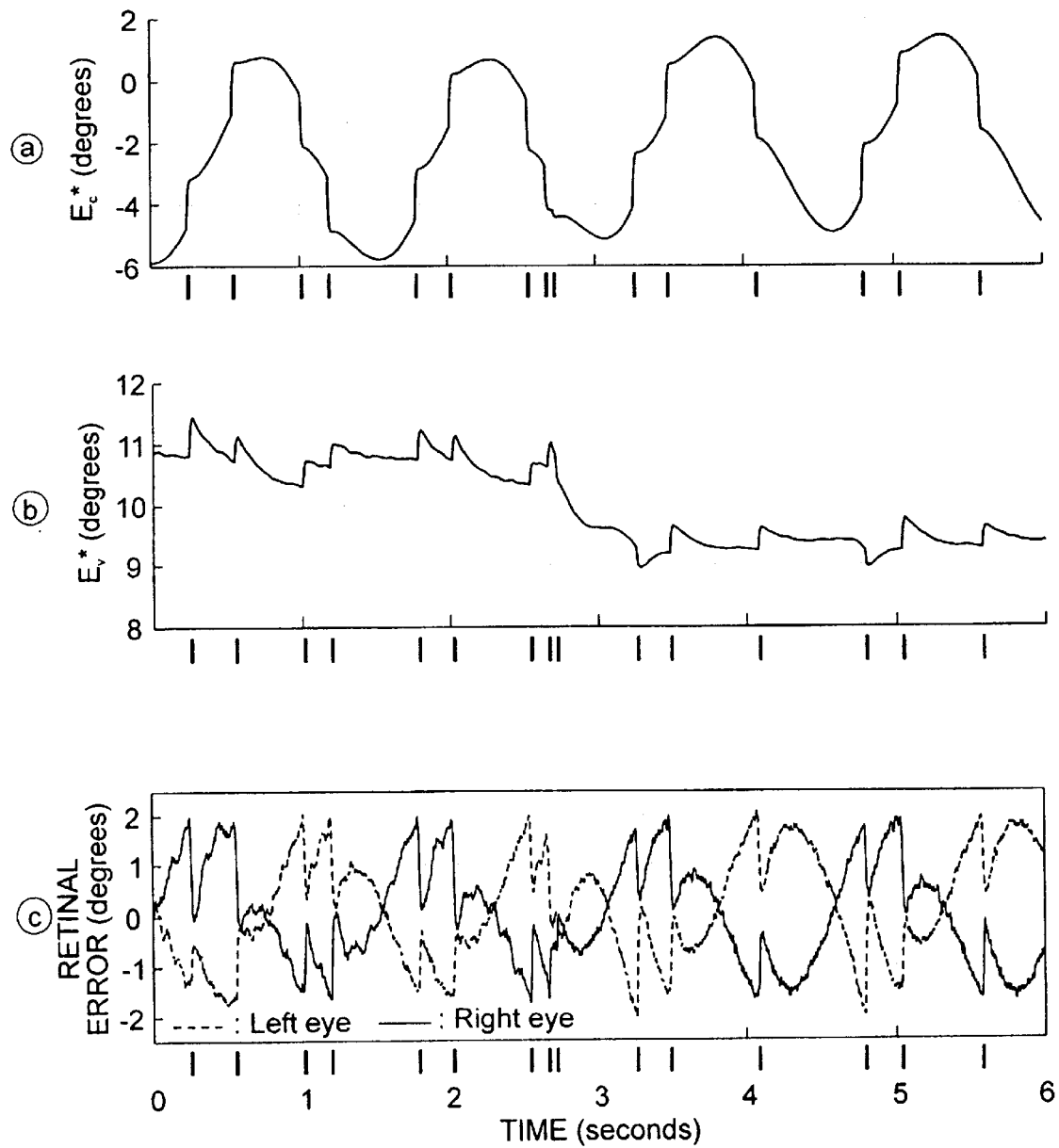
FIG. 21 is a graph showing experimental results of conjugate and vergence imaging device movement when controlled by a controller according to the invention wherein a target is moved in a sinusoidal pattern.

FIG. 21 shows the results of the experiment with the controller able to use both operating modalities. The retinal errors, in (c), reveal that tracking performance is indeed good, as each fast-phase acts to reduce error.

Figure 22:
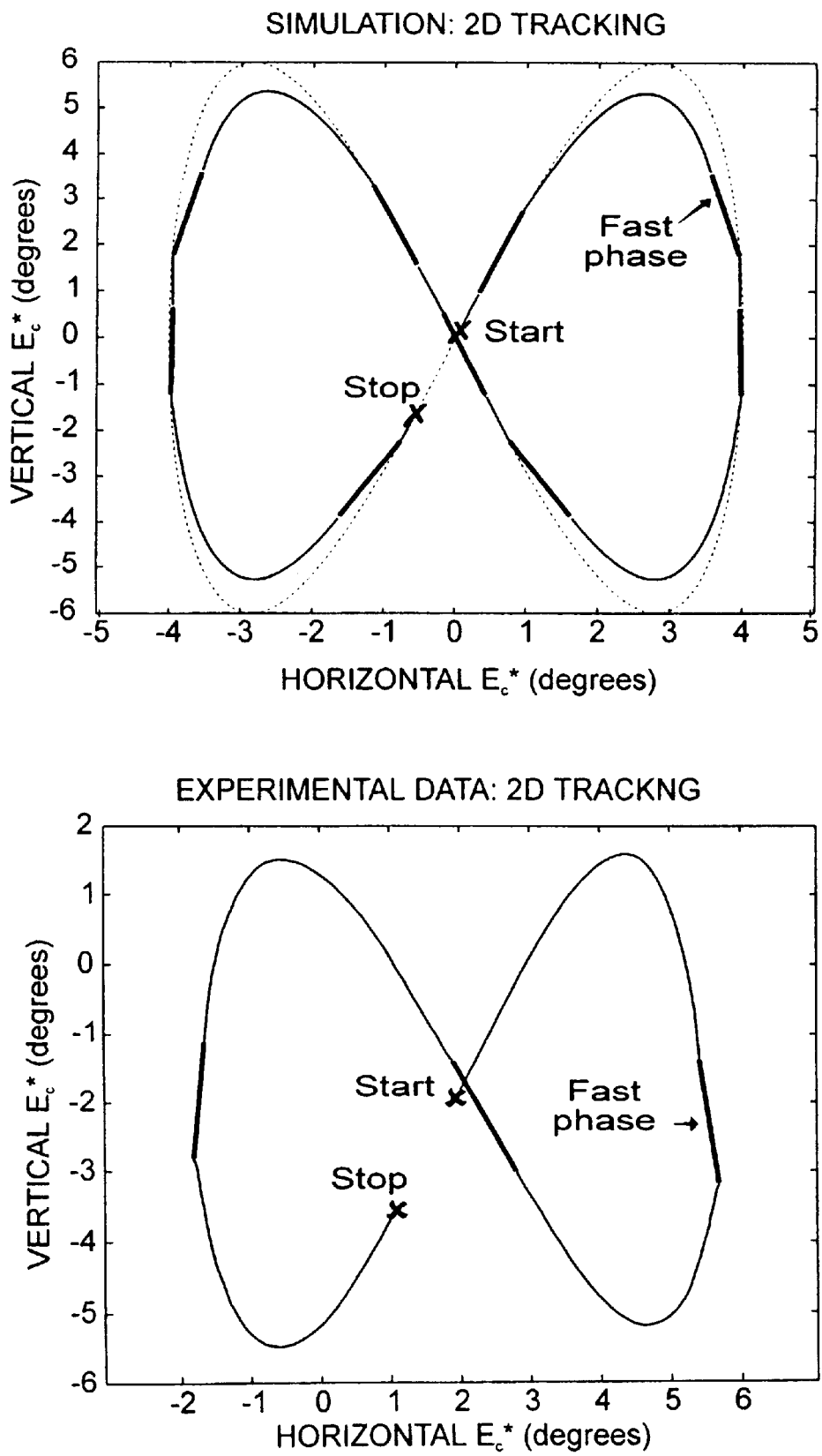
FIG. 22 is a plot of target tracking in three dimensions.
Figure 23:
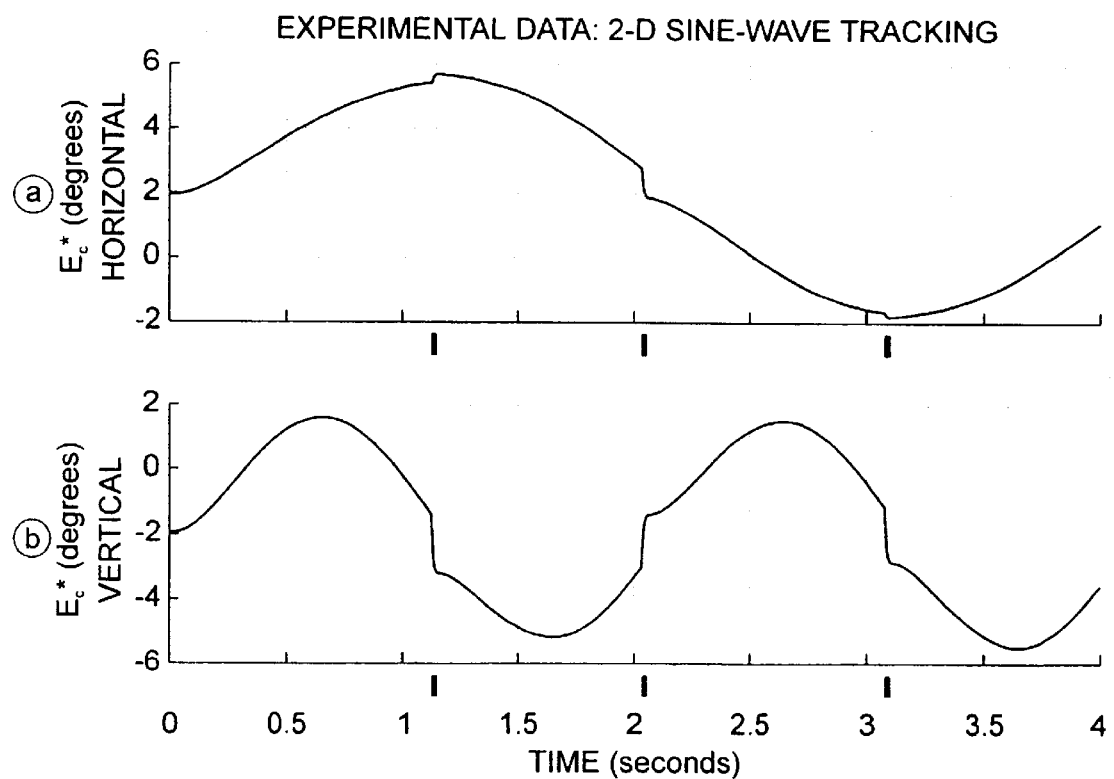
FIG. 23 is a plot of the signals from FIG. 22 shown in time.

FIG. 22 shows simulation and experimental results for three-dimensional target tracking. Again, practical results are in agreement with simulation results. FIG. 23 shows the vertical and horizontal conjugate imaging device responses in time. These figures demonstrate that the first and last fast-phase segments in (a) are due primarily to the large retinal error in (b) at these instances in time. Hence, when a fast-phase is triggered both the horizontal and vertical controllers are affected.

The prototype implementation of a bilateral controller according to the invention performs as desired. Both stable tracking and rapid reorientation are integrated into a single controller, which further provides independent, integrated co-ordination of the vergence and conjugate components of imaging device movement.

The bilateral controller disclosed herein is for control of binocular vision, without added complications of image processing for target selection. As indicated above, the present invention is applicable with any method of target identification for determination of retinal error. Alternatively, when a sensor is designed to detect retinal error directly, the system is also useful. Though the focus of the present invention is a controller for coordinating various aspects of imaging device motion, it also provides a simple architecture for integrating multi-sensory information and for coordinating imaging device motion with additional platforms.

The preferred binocular controller presented herein is distinguishable over the prior art in several ways. For example, the topology: a two-sided, symmetrical and inter coupled configuration, where each side controls an imaging device's motion. Another example is the integrated means by which both conjugate and vergent components of imaging device movement are coordinated. That is, a "vergence" control system and a "conjugate" control system are not individually identifiable. Nor, for that matter, is an explicit "saccadic" control system found since slow and rapid imaging device movements are coordinated in an integrated manner. All four components of imaging device movement—conjugate, vergence, slow, and fast—are coordinated in one integrated controller. Using such an integrated approach produces a simple and compact system, having two operating modalities. A significant advantage is low computational demands.

Figure 24:
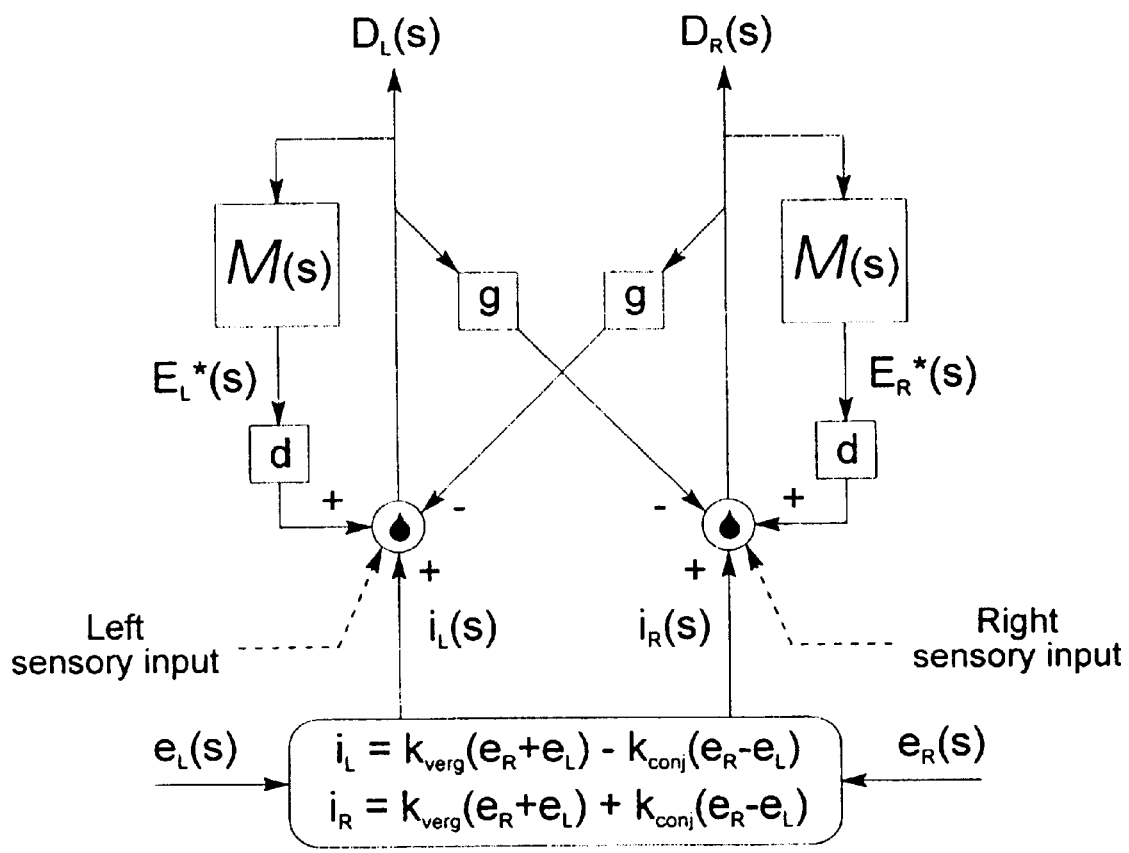
FIG. 24 is a block diagram of a butterfly controller core according to the invention incorporating sensory fusion of other sensory data.

Another advantage of the present invention is an ability to fuse multi-sensory stimuli. This is a natural consequence of the architecture described herein and resulting controller modes. This is illustrated by the addition of a biological-like vestibulo-ocular reflex (VOR), which stabilizes gaze during head perturbations, even in the dark. Referring to FIG. 24, an extract from a slow-phase system schematic of FIG. 5 is shown. In the case of angular VOR of human perception systems, additional sensory inputs are derived from the semi-circular canals. During head rotation the canals operate differentially. That is, they produce signals that are of opposite sign. Hence, simple projection of such differential motion signals onto the butterfly controller excites a differential mode and, for the horizontal system, produces conjugate movements of imaging devices, which are appropriate to compensate for detected rotation of a common support platform. Other forms of sensory information may be integrated into the controller in a similar way. Preferably, in the present invention sensory information excites appropriate butterfly controller modes in order to produce required imaging device movements.

Sensory fusion is achieved in the controller by making the butterfly act as a data funnel. Thus, incorporating additional sensory information does not require that separate and distinct control systems be added to the existing one. Advantageously, this is achieved without the problematic parallel architecture studied by Brown. In principle, then, coordinating a richer set of imaging-device-movement components does not necessarily make the control problem excessively difficult. Generally, the addition of an extra plant in the form of a platform for the imaging devices is straightforward.

The superior colliculus plays a key role in integrating multi-sensory information and in coding activity in various sectors of the visual field. The functionality of the colliculi is represented in the controller as a linear combination of retinal errors from each imaging device. This process precludes the use of a dominant imaging device, for example a master-slave arrangement, as is often used in other artificial vision systems.

System stability ultimately places an upper limit on attainable pursuit bandwidth. The fast-phase system, on the other hand, operating open-loop with respect to vision, complements the slow-phase pursuit system due to its ability to operate beyond the bandwidth of the latter. Switching between these two operating modalities generates a mixed system response, which on the whole, performs better tracking than the slow-phase system could achieve alone.

The key element in the butterfly controller structure is the use of model reference feedback to provide an estimate of imaging device position. Optionally, plant non-linearities are included within the model reference branch, when advantageous. For example, a saturation non-linearity can be included in series with a plant in order to provide a form of protection against large drives. In that case, the same non-linearity is preferably included in the feedback path, to preserve accurate state estimates.

An important issue during the operation of a vision system is its reaction to losing sight of a target. As noted above, the present controller has a predictable and acceptable reaction to loss of sight of a target.

Alternative Embodiments

In an embodiment, retinal error and imaging device control signals are used to predict information for future control. For example, the predicted information is used for maintaining imaging device focus, or, for example, for improving ramp tracking where, absent such a prediction, the slope of a slow-phase segment, following a fast-phase, does not match the slope of the target trajectory. For example, many tracking systems employ some form of Kalman filtering to predict target trajectory. Alternatively, the type of the system is increased by including integrator elements. Since integrators tend to destabilize a system this is not preferred.

The simplicity and compactness of the controller according to the invention make it a natural candidate for miniaturization and eventual implementation in integrated-circuit (IC) form. Thus, it will be necessary to adapt the present invention as a digital controller clocked at appropriate clock rates. Once implemented in an IC, the present invention is useful in controlling many different systems. Binocular vision systems, of course, can be controlled with the controller. So can monocular systems where target tracking is desired. Also, platform stabilisation applications are well suited to the controller. In an alternative embodiment, the controller is adapted to evoke binocular imaging device movement toward that target, even though one of the two imaging devices initially does not image the target. This also allows the controller to operate reasonably in the event that the target is outside the view of an imaging device. This will support monocular operation of the controller.

Figure 25:
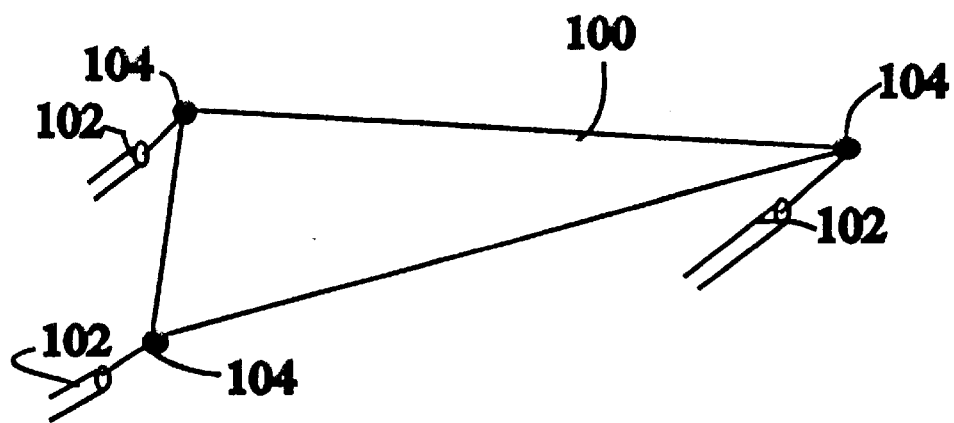
FIG. 25 is a simplified diagram of a platform supported by a plurality of actuators and having a plurality of sensors disposed thereon for use in platform stabilisation.

The invention has applications in general platform stabilisation. In the case of a non-motorised support platform (A) under positioning devices (B), a VOR capability is used to null positioning errors through compensatory motion of the devices (B) according to motion sensing of the support platform (A), thereby reducing the effects of perturbations on orientation. Additionally, for a controllable support platform (A), positioning errors in devices (B) and motion of the support platform (A) are reduced simultaneously, providing even better stabilisation of the last platforms in a chain (here B). An example is provided in FIG. 25, where a platform 100 for stabilisation is shown. The platform 100 is shown as a triangular platform having three actuators 102, one at each corner thereof. Also at each corner is disposed a stability sensor 104. Sensed stability data in the form of placement error and/or simple motion from a plurality of sensors 104 is provided to a controller and the platform 100 is stabilised in accordance with the sensed data. Because the controller provides a stable feedback loop tending toward a null error—null motion, the system is believed to perform well in this application. Analogous to gaze control, an objective of the controller according to the present embodiment is 3-D error reduction and surface stabilisation, by nulling sensor signals and/or internal estimates of platform positions. A preferred application would use at least two stacked platforms. Optionally fewer or more than three sensors are used. As such, it will be evident to those of skill in the art, that the invention is applicable to a wide variety of applications.

In a further embodiment, the imaging devices are mounted on a platform analogous to a head, and eye-head co-ordination is necessary. This is facilitated using the present architecture since a plant for controlling platform motion and plants for controlling imaging device motion each receive a same signal and effectively move in a co-ordinated fashion. The resulting system operates correctly because the present architecture provides a control signal in an attempt to correct error and not in order to move the imaging devices' line of sight s to a target location in global co-ordinates. For example, the method proposed by Galiana and Guitton in Galiana, H. L., and D. Guitton, "Central Organization and Modeling of Eye-Head Coordination During Orienting Gaze Shifts," *Annals of the New York Academy of Sciences*, Vol. 656, pp. 452–471, 1992, which is based on motor-error control as opposed to world-co-ordinate control. The idea behind motor-error based control is straightforward; both oculomotor and head controller systems are driven with a same control signal. A feedback pathway for the head is added in parallel with the eye controller feedback pathway to converge on the same butterfly summation nodes. Additionally but not necessarily, when a sensor exists for head-platform motion or orientation, its signal is optionally incorporated in this additional feedback pathway and provide advantages in the presence of perturbations. Motor-error based control, providing a same control signal to each plant, is essentially unheard of in the field of robotic control.

Figure 26:
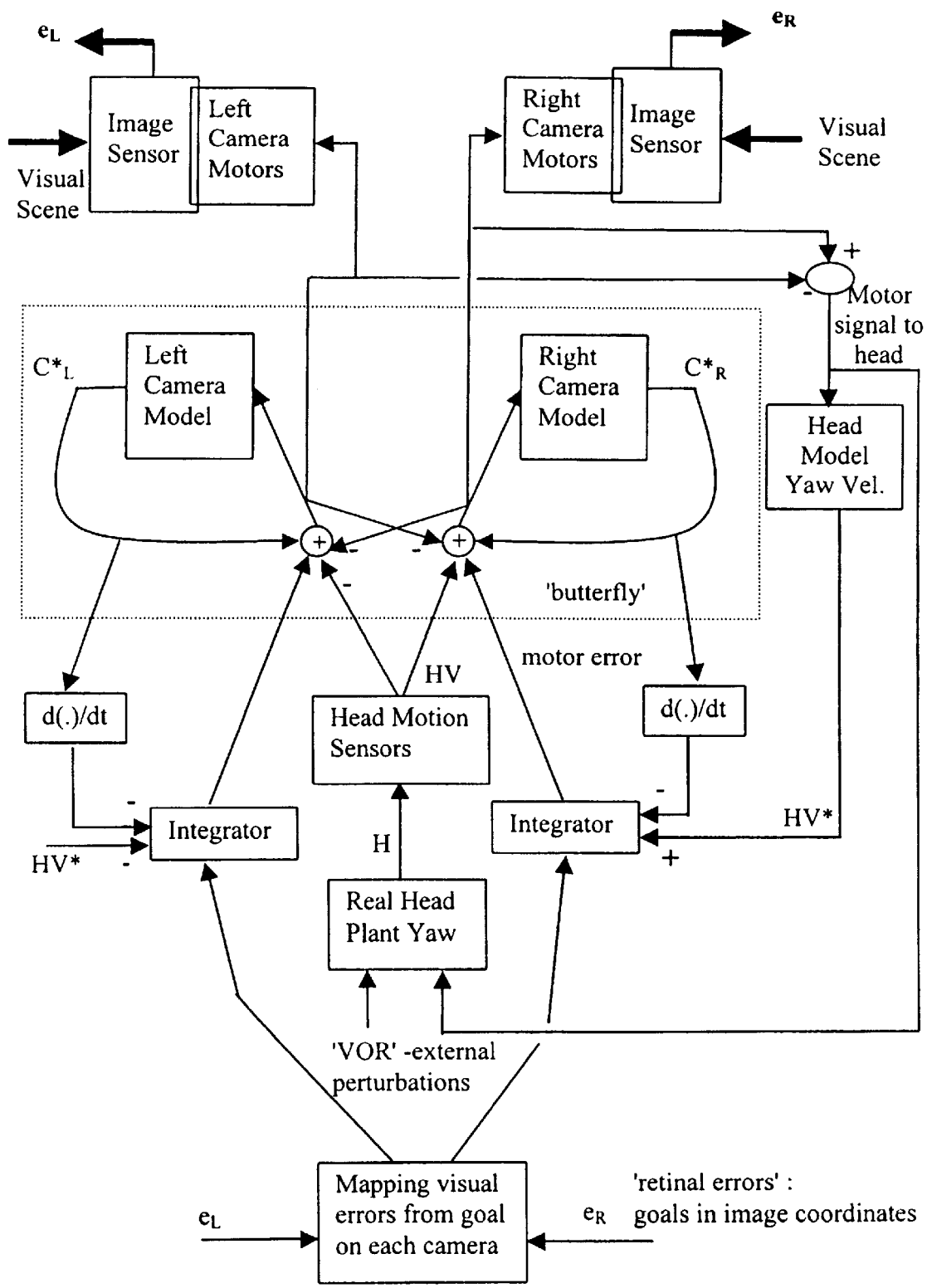
FIG. 26 is a diagram of a butterfly controller for controlling three plants, a plant for each of two imaging devices and a plant for head movement, and for accepting sensory data from a head sensor.

Referring to FIG. 26, a high level schematic is presented illustrating basic principles of operation of a controller according to the invention, as applied to the co-ordination of 2 imaging devices with a supporting head for simple rotation/perturbation of platforms about a vertical axis and 2-D movement of a target in a plane normal to the rotation axis. Alternatively using only a differential mode of FIG. 26, co-ordination of a monocular vision system on a moving head is accomplished.

Figure 27:
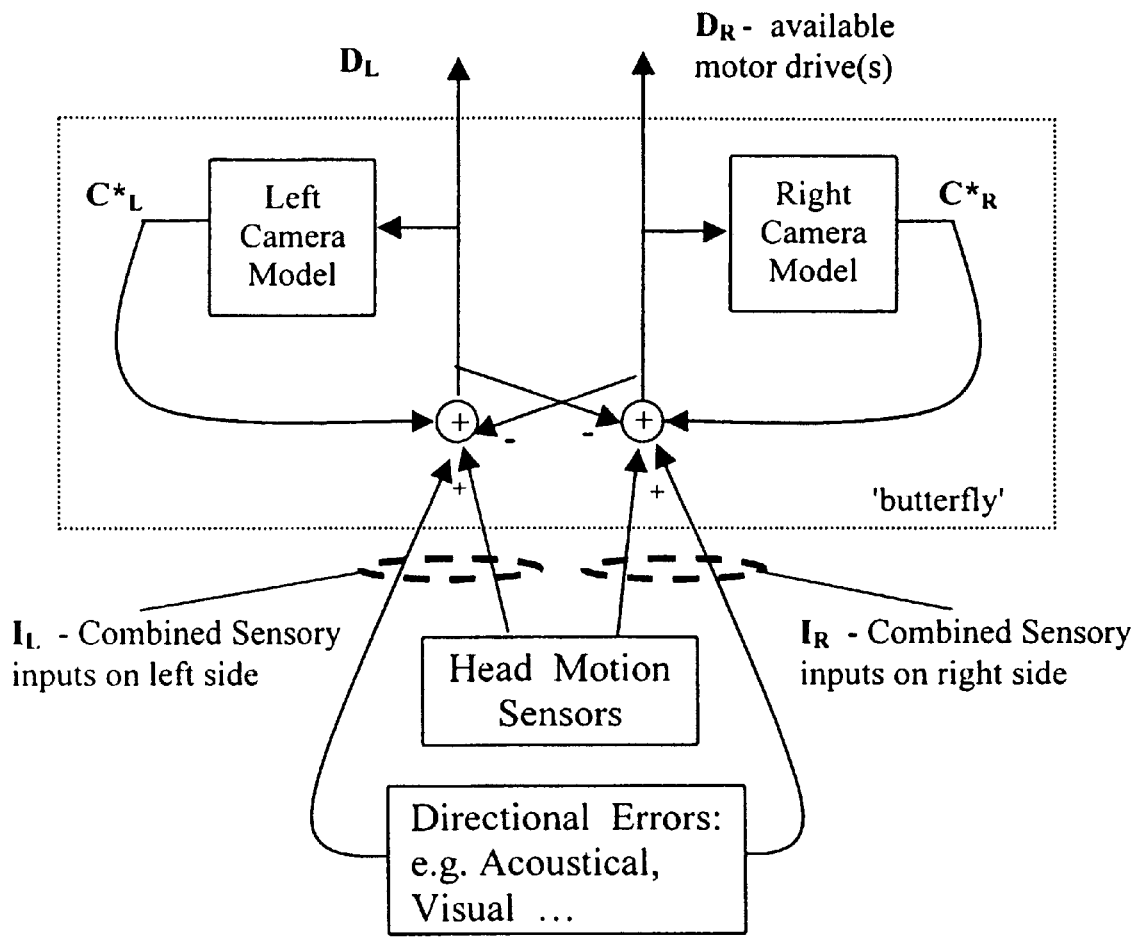
FIG. 27 is a simplified diagram illustrating sensory convergence and diversified motor strategies from a single integrated control circuit.
Figure 28:
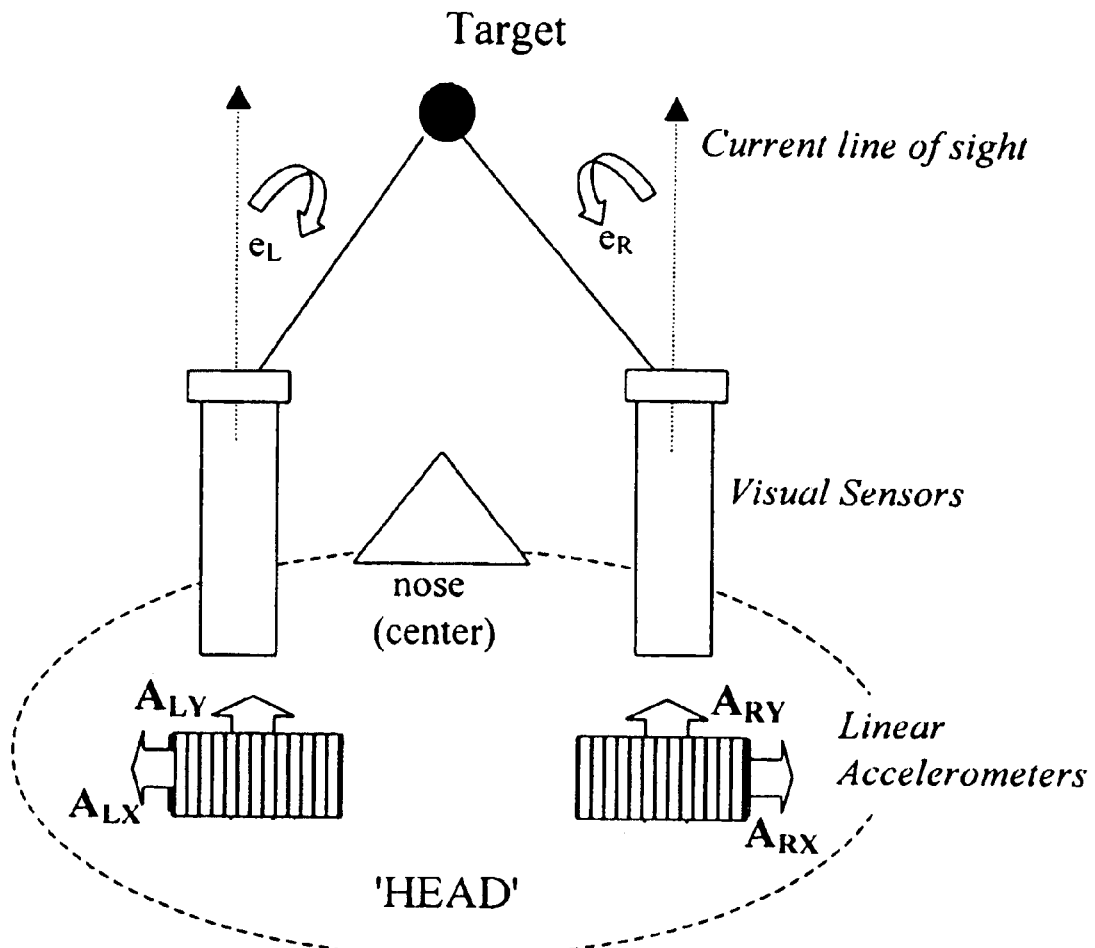
FIG. 28 is a simplified diagram showing sensory directional sensitivities for optimally exciting imbedded controller modes.

This is best explained by referring to the basic properties of the central core 'butterfly', shown in FIG. 27. Given combined sensory inputs on each side ($I_R$, $I_L$), two outputs are available as motor drives for all plants ($D_R$, $D_L$). These have a particular relationship, which is useful for independent tuning of two imbedded response modes: the common mode and the difference mode, with respective transfer functions.

The control signals provided to the plants are used appropriately to control several platforms in a co-ordinated fashion, provided the co-ordinates of each are selected appropriately. For example, each plant receives same control signals. Since the controller is attempting to zero error, the addition of extra plants for correcting error will reduce the time for performing error correction.

Given a symmetrical camera co-ordinate system, the conjugate (panning) component of the two-camera system will depend only on the difference between sensory inputs on the two sides. Vergence (angle between cameras' lines of sight), on the other hand, only depends on the sum of all inputs. Each mode has its own dynamics, though in a visual tracking system similar dynamics are preferred. The response mode elicited therefore simply depends on the pattern of sensory signals. In contrast to previous systems, which use a different controller for each desired mode, here asymmetric sensory patterns automatically produce mixed-mode responses.

This describes the use of the controller to co-ordinate two imaging devices and to simultaneously drive a supporting head rotating in a plane parallel to that of the eyes. The head is driven with the difference mode. Further, sensory transducers sense head motion, whether controlled or unexpected (perturbed).

A controller according to the invention is tolerant of non-linearities in motor drives (e.g. slew rates) or motor excursion limits, provided they are included in the internal models. Despite these limitations, the combined camera/head system provides apparent linear tracking performance over wider amplitude ranges and bandwidths than cameras alone and with less complexity than prior art systems.

The controller complexity depends only on the order of all internal estimated models and not on the number of desired control modalities. The latter are executed via parametric changes in a single shared controller while platform control relies on suitable combinations of same available outputs.

The controller has been illustrated to function with two identical imaging device plants. However, by allowing a parametric asymmetry in the controller without losing topological symmetry there is potential for accommodating different imaging device plants. This ability, and the tolerance of the controller topology to plant dissimilarities is an advantage of the present controller.

The present embodiment relies on two modalities, each linked to a topology and a parameter set (slow in symmetrical coupled system, fast in uncoupled system). Further embodiments achieve multiple modalities in each of the slow and fast controller topologies by defining multiple parameter sets linked to an array of error thresholds. This does not increase the dynamic complexity of the controller from its current level, nor computation time and it allows, for example, the selection of emergency high-speed modes under defined conditions.

Figure 29:
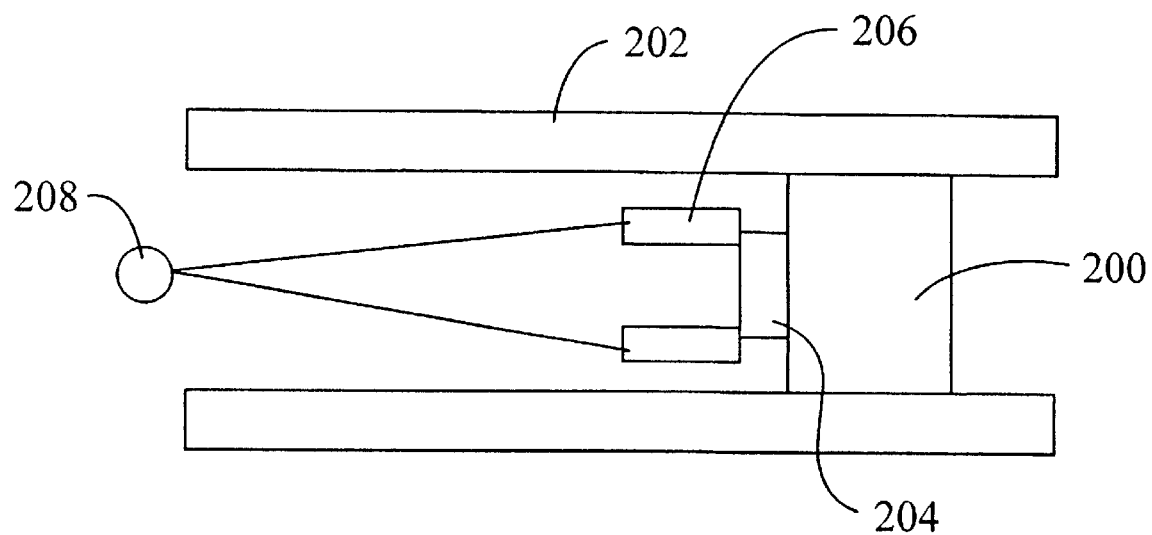
FIG. 29 is a simplified diagram of a method of adjusting distance using a controller according to the invention.

Referring to FIG. 29, an embodiment of the invention is shown for accurate placement or measurement. A platform 200 is disposed on rails 202 for allowing the platform to slide forwards and backward. On the platform a controller 204 according to the invention and two imaging devices 206 are disposed. The imaging devices 206 are at a fixed angle of vergence. The controller 204 provides a signal from one mode to a plant (not shown) for moving the platform toward and away from a target 208. The platform moves until retinal error is within predetermined limits then, an actuator signal is provided. This allows for accurate focus within an image captured with a lens having a fixed focal length and depth of field. It is also useful in painting and other applications where a machine's position and distance to a surface affects machine operation and/or results of the operation. Additionally the other mode in the controller is optionally used for lateral positioning of the above positioning system. Further additionally, signals from motion sensors on the platform are fused with visual errors to provide compensation for unexpected perturbations. This extends useful applications to higher precision.

Some potential applications for the invention include modelling of human eye/head motion for human operators to reduce delays in remote loops, tele-operation system design and implementation, tracking target objects for use in photography, robotics, manufacturing, security and so forth, measurement of distance, and platform stabilisation.

Figure 30:
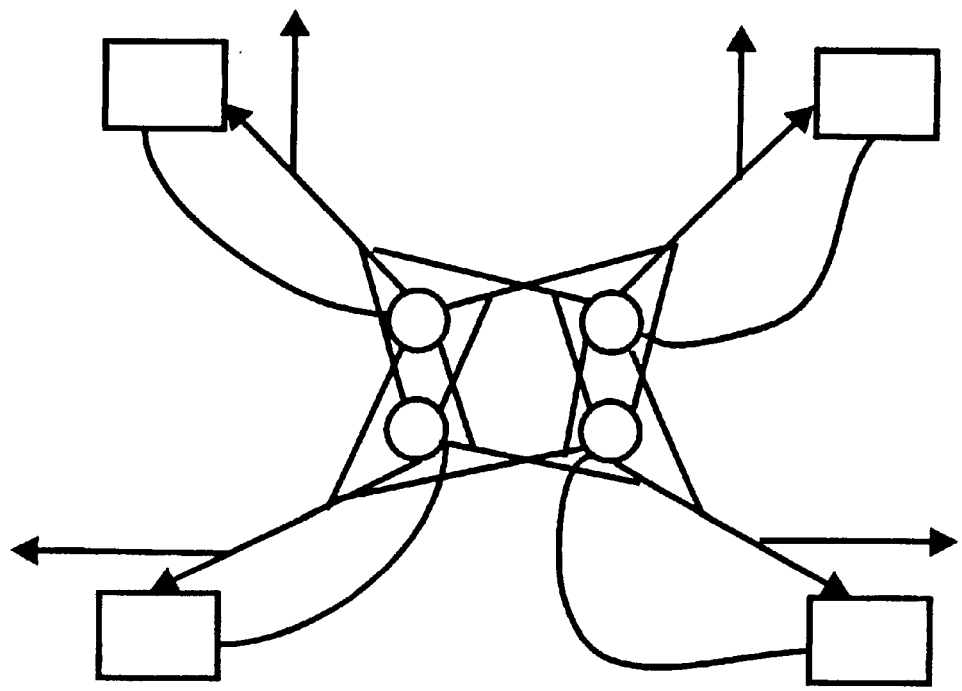
FIG. 30 is a simplified diagram of a controller supporting more than two modes and having more than two "Wings;" and, FIG. 31 is a simplified diagram of another controller supporting more than two modes and having more than two "Wings."
Figure 31:
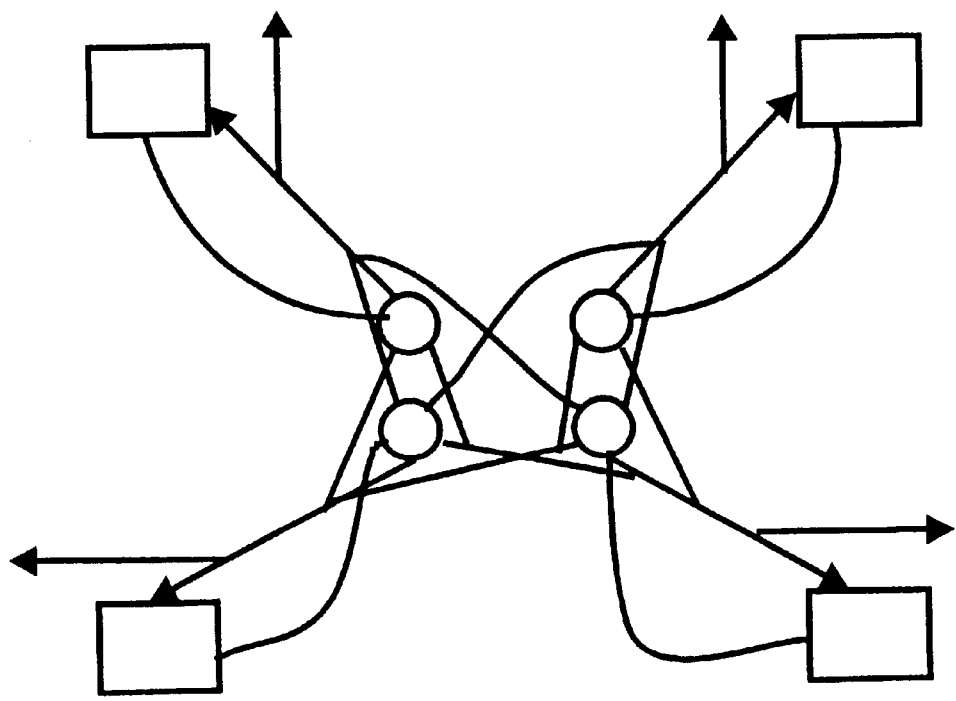

The invention is applicable to, for example, multi-segmental control. Referring to FIG. 9, the 2-node butterfly described in the preferred embodiment of the invention is augmented to include more 'wings' of the butterfly around a central core, with each wing attached to a node interconnected to the other wing nodes. The result shown provides architecture for a controller capable of controlling at least as many plants as there are 'wings'—four (4) in FIG. 9. Control of the plants is performed in a number of modes governed by the number of wings and the pattern of sensory signals impinging on the multiple nodes. Again, complexity is limited to the number of states in the plant models in each wing, but co-ordination of multi-segments is preserved using a shared motor error. Also, an increased number of modalities is supported since a larger number of gain parameters are modifiable. Referring to FIG. 31, another diagram of a controller similar to that shown in FIG. 30 is presented. Here, instead the wings are arranged in a chain having its two ends unconnected. As is evident, there is sufficient information flow from any wing to another to support the plurality of modes and the plurality of modalities. Use of a closed loop of wings or a chain of wings is determined based on an application and other design criteria.

For example, when an arm is added to a head platform, a third wing is added to the butterfly controller. The third wing need not be symmetrical to the other two wings since it controls a different plant. When desired, visual feedback from the arm to the visual system is provided so as to provide additional sensory information for tracking the arm and for use in controlling arm motion.

The present invention is also useful in control of cameras for use in a telepresence system. Such a system is useful for remote operation of space vehicles, mining vehicles and the like. By providing retinal errors to the controller, the telepresence system can better simulate eye motion for a user of such a system.

Numerous other embodiments of the invention may be envisioned without departing from the spirit or scope of the invention.

What is claimed is:

1. A method of controlling gaze in a binocular vision system having two imaging devices and at least a plant for moving at least an imaging device comprising the steps of:

a) providing to a processor a retinal error relating to location of a target as imaged by each of the two imaging devices;

b) providing to the processor a model related to each of the two imaging devices; and, c) using the processor, determining from both retinal errors absent calculation of the target location in spatial co-ordinates a control signal related to imaging device motion for reducing the provided retinal errors.

2. A method of controlling gaze in a binocular vision system as defined in claim 1 wherein the control signal comprises two control signals for controlling device motion along a same dimension and within a same plane.

3. A method of controlling gaze in a binocular vision system as defined in claim 2 wherein the controller is a butterfly controller having the following transfer functions $$D_L(s) = \frac{1}{2}\left(\frac{i_R(s) + i_L(s)}{1 + g - dM(s)}\right) - \frac{1}{2}\left(\frac{i_R(s) - i_L(s)}{1 - g - dM(s)}\right), \text{ and} \quad (5.3)$$

$$D_R(s) = \frac{1}{2}\left(\frac{i_R(s) + i_L(s)}{1 + g - dM(s)}\right) + \frac{1}{2}\left(\frac{i_R(s) - i_L(s)}{1 - g - dM(s)}\right). \quad (5.4)$$

4. A method of controlling gaze in a binocular vision system as defined in claim 2 wherein motion of each of the two imaging devices is controlled by a separate plant associated with each imaging device and by another plant associated with a movable platform upon which both imaging devices are disposed and wherein the control signal is provided to some of the plants.

5. A method of controlling gaze in a binocular vision system as defined in claim 4 wherein the control signal is provided to each of the plants.

6. A method of controlling gaze in a binocular vision system as defined in claim 5 wherein the controller comprises a butterfly controller having two input ports and two output ports, the two input ports for receiving each of the two retinal errors; the control signal comprising two signal components, a signal component provided at each of the two output ports.

7. A method of controlling gaze in a binocular vision system as defined in claim 2 comprising the step of:
providing another sensor input to the processor wherein the sensor input is used to determine the control signal.

8. A method as defined in claim 7 wherein the processor is in the form of a butterfly controller for simultaneously processing each retinal error and the other sensor input, and for determining a same control signal for provision to each plant.

9. A method of controlling gaze in a binocular vision system as defined in claim 2 comprising the step of:
providing another sensor input to the processor;
providing a model relating to the sensor to the processor, wherein the sensor input is used to determine the control signal for provision to the plant for moving the imaging devices to reduce retinal errors.

10. A method as defined in claim 2 wherein the step (c) comprises the steps of:
c1) using the processor, determining from both retinal errors absent calculation of target location in spatial co-ordinates a control value related to imaging device motion for reducing the provided retinal errors; and,
c2) providing a control signal based on the control value.

11. A method as defined in claim 2 wherein the control signal is calculated in a simultaneous and integrated fashion for both pan and vergence of both imaging devices in a coordinated fashion.

12. A method as defined in claim 2 wherein the step (a) comprises the steps of:
a1) providing image data from a first imaging device;
a2) providing image data from a second imaging device;
a3) determining a first target location within the image data from a first imaging device and a second target location within image data from a second imaging device; and
a4) deriving a retinal error related to each imaging device from the determined target locations.

13. A method as defined in claim 2 wherein the processor is in the form of a butterfly controller for simultaneously processing each retinal error and for determining a same control signal for provision to each plant.

14. A method as defined in claim 2 wherein the control signal relating imaging device motion for reducing the retinal error is determined absent calculation of independent control signals for panning and vergence.

15. A method as defined in claim 2 wherein the same control signal is provided to each plant for controlling motion of any platform upon which at least one of the first imaging device and the second imaging device are disposed.

16. A method as defined in claim 2 comprising the steps of:
determining a state of imaging device motion; and,
when retinal error is substantially small, determining a value based on vergence of the imaging devices, the value related to a distance from the imaging devices to the target.

17. A method as defined in claim 16 comprising the steps of:
adjusting a focus of each imaging device in dependence upon the determined value.

18. A method as defined in claim 16 comprising the steps of:
using current position and retinal error, determining estimated focus adjustment of imaging devices.

19. A method as defined in claim 18 comprising the steps of:
using current position and retinal error, determining butterfly controller gain adjustment;
adjusting gains within the butterfly controller based on the determined butterfly gain adjustments.

20. A method as defined in claim 2 comprising the steps of:
providing a known angle of vergence between the two imaging devices;
adjusting a distance between the imaging devices and the target to reduce retinal error; and,
when retinal error is below a predetermined level, providing an indication,
whereby the retinal error is below a predetermined level when the imaging devices are a predetermined distance from the target.

21. A method of controlling gaze in a binocular vision system as defined in claim 1 wherein the control signal comprises at least three control signals for controlling device motion in each of two dimensions.

22. A method of controlling sensor orientation in a bi-sensor system including a first sensory device, a second sensory device and a plurality of plants for controlling motion of the sensory devices, the method comprising the steps of:
a) providing to a processor sensory errors relating to a location of a target as sensed by each of the two sensory devices;
d) providing a model related to each plant from the plurality of plants to the processor; and,
e) using a processor having a symmetric topology determining a same output signal for provision to the plurality of plants for controlling the sensory device motion, the control signal related to sensory device motion for reducing the sensory error from said sensory device, the determination in dependence upon the provided model and the provided sensory errors.

23. A method of controlling sensor orientation in a bi-sensor system as defined in claim 22 wherein the output signal includes a common component output signal and a differential component output signal.

24. A method of controlling sensor orientation in a bi-sensor system as defined in claim 23 wherein the sensory devices are imaging devices and wherein the differential component of the control signal is used to control one of panning and vergent motion of the sensory devices and the common component of the output signal is used for controlling the other of panning and vergent motion of the sensory devices.

25. A method of controlling sensor orientation in a bi-sensor system as defined in claim 22 wherein the sensory devices are imaging devices and wherein the processor is a single processor for calculating in an interdependent fashion the output signal related to the sensory device motion for both pan and vergence of the two imaging devices absent calculation of target location in spatial co-ordinates.

26. A method of controlling sensor orientation in a bi-sensor system as defined in claim 22 wherein the sensory errors are not based on a world co-ordinate system.

27. A method of controlling sensor orientation in a bi-sensor system as defined in claim 22 wherein the sensory devices, the controller and the plants define a feedback loop for accepting sensory errors and providing a control signal for moving the sensory devices in order to reduce the sensory errors, the control signal being provided to the plants until the sensory errors are substantially 0.

28. A method of controlling sensor orientation in a bi-sensor system as defined in claim 27 wherein the feedback loop operates in each of two modes, a first mode for reducing small sensory errors and a saccade mode for reducing sensory errors other than small sensory errors.

29. A method of controlling sensor orientation in a bi-sensor system as defined in claim 28 wherein during saccade mode the control signal relates to substantially rapid motion of the sensory devices.

30. A method of controlling sensor orientation in a bi-sensor system as defined in claim 29 wherein the control signal relates substantially rapid motion including panning and vergence motion.

31. A method of controlling sensor orientation in a bi-sensor system as defined in claim 22 comprising the step of: providing sensory data from another sensory device;

wherein the two sensory devices, the other sensory device, the controller and the plants define a feedback loop for accepting sensory errors and sensory data and for providing a control signal for moving the sensory devices in order to reduce the sensory errors, the control signal being provided to the plants until the sensory errors are substantially 0.

32. A controller for a vision system having an imaging device associated with a plant for providing motion to the imaging device, the controller comprising:

a first processor for controlling saccade phase movement of the imaging device, the first processor having a first input and a first output;

a second processor for controlling slow phase movement of the imaging device, the second processor having a second input and a second output;

wherein the second processor and the first processor are substantially same and are provided with same input signal and provide an output signal to a same plant.

33. A controller for a vision system as defined in claim 32, wherein the vision system is a binocular vision system having two imaging devices each associated with a plant for providing motion to the imaging devices;

wherein the first processor has first inputs and first outputs;

wherein the second processor has second inputs and second outputs; and wherein the second processor and the first processor are provided with same input signals and provide output signals to same plants.

34. A controller for a vision system as defined in claim 32 wherein the first processor and the second processor are a same processor having some different gain parameters.

35. A controller for a vision system as defined in claim 34 wherein the some different gain parameters are zero for a processor of the first processor and the second processor and another non-zero value for the other processor of the first processor and the second processor.

36. A controller for a vision system as defined in claim 32 wherein the second processor comprises a feedback loop having stable open loop dynamics.

* * * * *